US011363572B2

(12) United States Patent
Wang et al.

(10) Patent No.: US 11,363,572 B2
(45) Date of Patent: Jun. 14, 2022

(54) UPLINK CHANNEL DYNAMIC WAVEFORM SWITCHING

(71) Applicant: QUALCOMM Incorporated, San Diego, CA (US)

(72) Inventors: Renqiu Wang, San Diego, CA (US); Hao Xu, San Diego, CA (US); Wei Zeng, San Diego, CA (US); Jing Jiang, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 48 days.

(21) Appl. No.: 15/458,017

(22) Filed: Mar. 13, 2017

(65) Prior Publication Data
US 2018/0035423 A1  Feb. 1, 2018

Related U.S. Application Data

(60) Provisional application No. 62/369,719, filed on Aug. 1, 2016.

(51) Int. Cl.
 *H04W 72/04* (2009.01)
 *H04L 5/00* (2006.01)
 (Continued)

(52) U.S. Cl.
 CPC ...... *H04W 72/0413* (2013.01); *H04B 7/0413* (2013.01); *H04B 17/336* (2015.01);
 (Continued)

(58) Field of Classification Search
 CPC ... H04B 17/336; H04B 7/0413; H04L 1/0003; H04L 1/0009; H04L 27/0008;
 (Continued)

(56) References Cited

U.S. PATENT DOCUMENTS 6,853,843 B2    2/2005  Chen et al.
8,416,759 B1 *  4/2013  Narasimhan ...... H04W 56/0035
                                                370/344
(Continued)

FOREIGN PATENT DOCUMENTS

CN      102119553 A     7/2011
CN      103069893 A     4/2013
WO      WO-2010039559   4/2010

OTHER PUBLICATIONS

Hervas M., et al., "Advanced Modulation Schemes for an Antarctic Long Haul HF Link", Telecommunication Systems, Baltzer Science Publishers, Basel, CH, Nov. 5, 2015 (Nov. 5, 2015), vol. 62, No. 4, XP035988049, pp. 757-770.

(Continued)

*Primary Examiner* — Khaled M Kassim
*Assistant Examiner* — Zhaohui Yang
(74) *Attorney, Agent, or Firm* — Holland & Hart LLP

(57) ABSTRACT

Methods, systems, and devices for wireless communication are described A user equipment (UE) and a base station may support switching from one waveform to another on uplink channels. For example, a UE and a base station may utilize both frequency division multiplexing (SC-FDM) waveform and an orthogonal frequency division multiplexing (OFDM) waveforms based on channel conditions and other factors. In some examples, a UE may switch for some uplink channels, and use a single waveform for other channels. For example, switching waveforms for channels that utilize frequency domain code division multiplexing (CDM) channel may interrupt the orthogonality of multiplexed transmissions. A UE may transition from one waveform to another either autonomously or based on an explicit indication from a base station. If a UE switches autonomously, it may send an indication of the transition to the serving base station.

23 Claims, 21 Drawing Sheets

(51) Int. Cl.
*H04B 17/336* (2015.01)
*H04B 7/0413* (2017.01)
*H04L 1/00* (2006.01)
*H04L 27/00* (2006.01)

(52) U.S. Cl.
CPC .......... *H04L 1/0003* (2013.01); *H04L 1/0009* (2013.01); *H04L 5/0007* (2013.01); *H04L 5/0021* (2013.01); *H04L 5/0028* (2013.01); *H04L 5/0048* (2013.01); *H04L 5/0051* (2013.01); *H04L 5/0092* (2013.01); *H04L 27/0008* (2013.01)

(58) Field of Classification Search
CPC ... H04L 5/0007; H04L 5/0021; H04L 5/0028; H04L 5/0048; H04L 5/0051; H04L 5/0092; H04W 72/0413
See application file for complete search history.

(56) References Cited

U.S. PATENT DOCUMENTS

| | | | | |
|---|---|---|---|---|
| 8,705,441 | B2 | 4/2014 | Xu et al. | |
| 8,913,672 | B2* | 12/2014 | Luo | H04L 1/0039 |
| | | | | 375/260 |
| 9,608,780 | B2 | 3/2017 | Luo et al. | |
| 2004/0131110 | A1 | 7/2004 | Alard et al. | |
| 2005/0002358 | A1 | 1/2005 | Miyoshi et al. | |
| 2010/0002800 | A1* | 1/2010 | Kim | H04L 5/0037 |
| | | | | 375/295 |
| 2010/0034152 | A1* | 2/2010 | Imamura | H04L 5/0007 |
| | | | | 370/329 |
| 2011/0110357 | A1* | 5/2011 | Chung | H04W 48/08 |
| | | | | 370/344 |
| 2011/0205966 | A1* | 8/2011 | Iwai | H04L 1/0021 |
| | | | | 370/328 |
| 2011/0261774 | A1* | 10/2011 | Lunttila | H04L 5/0007 |
| | | | | 370/329 |
| 2014/0219387 | A1 | 8/2014 | Ma et al. | |
| 2015/0181589 | A1 | 6/2015 | Luo et al. | |
| 2016/0278117 | A1* | 9/2016 | Sahlin | H04B 7/2615 |
| 2018/0026765 | A1* | 1/2018 | Brent | H04B 7/04 |
| | | | | 370/329 |
| 2018/0063820 | A1* | 3/2018 | Xiong | H04W 72/042 |
| 2018/0097578 | A1* | 4/2018 | Li | H04L 1/0004 |

OTHER PUBLICATIONS

Narasimhan B., et al., "SFBC Design Tradeoffs for Mobile SC-FDMA with Application to LTE-advanced". Acoustics Speech and Signal Processing (ICASSP), 2010 IEEE International Conference on, IEEE, Piscataway, NJ, USA, Mar. 14, 2010 (Mar. 14, 2010), XP031697891, pp. 3458-3461.

IPEA/EP, Second Written Opinion of the International Preliminary Examining Authority, Int'l Application No. PCT/US2017/043292, dated Jul. 9, 2018, European Patent Office, Rijswijk, NL, 42 pgs.

ISA/EP, International Search Report and Written Opinion of the International Searching Authority, Int'l Application No. PCT/US2017/043292, dated Oct. 27, 2017, European Patent Office, Rijswijk, NL, 16 pgs.

Motorola, "OFDMA vs. SC-FDMA—Study on Hybrid Scenario for LTE-A UL Access," 3GPP TSG-RAN WG1 Meeting #55bis, R1-090322, Ljubljana, Slovenia, Jan. 12-16, 2009, 5 pgs., XP050318234, 3rd Generation Partnership Project.

Nokia et al., "Data-Non-Associated Control Signal Transmission Without UL Data," 3GPP TSG RAN WG1 Meeting #48bis, R1-071676, St. Julian's, Malta, Mar. 26-30, 2007, 6 pgs., XP050105599, 3rd Generation Partnership Project.

Panasonic, "Technical Proposals and Considerations for LTE Advanced," 3GPP TSG RAN WG1 Meeting #53, R1-081791, Kansas City, USA, May 5-9, 2008, 16 pgs., XP050596755, 3rd Generation Partnership Project.

Qualcomm Europe, "UL Control Details for TDD," 3GPP TSG RAN1 Meeting #51 bis, R1-080482, Sevilla, Spain, Jan. 14-18, 2008, 6 pgs., XP050109000, 3rd Generation Partnership Project.

* cited by examiner

US 11,363,572 B2

1

UPLINK CHANNEL DYNAMIC WAVEFORM SWITCHING

CROSS REFERENCES

The present Application for Patent claims priority to U.S. Provisional Patent Application No. 62/369,719 by Wang, et al., entitled "Uplink Channel Dynamic Waveform Switching," filed Aug. 1, 2016, assigned to the assignee hereof, which is hereby expressly incorporated by reference herein in its entirety.

INTRODUCTION

The following relates generally to wireless communication, and more specifically to uplink (UL) channel dynamic waveform switching.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

UEs and base stations may communicate using one of a variety of multiplexing schemes. For example, in some systems, a UE and a base station may communicate single carrier frequency division multiplexing (SC-FDM) on uplink channels and use orthogonal frequency division multiplexing (OFDM) on downlink channels. However, in some cases, OFDM may provide improved performance than SC-FDM for uplink transmissions. Thus, using SC-FDM exclusively may result in suboptimal performance, and reduced throughput.

SUMMARY

A method of wireless communication is described. The method may include determining whether an uplink physical layer channel is configured for frequency domain CDM, selecting a waveform switching mode based at least in part on the determination of whether the physical layer channel is configured for frequency domain CDM, identifying a waveform for the physical layer channel based at least in part on the waveform switching mode, and communicating on the physical layer channel using the identified waveform.

An apparatus for wireless communication is described. The apparatus may include means for determining whether an uplink physical layer channel is configured for frequency domain CDM, means for selecting a waveform switching mode based at least in part on the determination of whether the physical layer channel is configured for frequency domain CDM, means for identifying a waveform for the physical layer channel based at least in part on the waveform switching mode, and means for communicating on the physical layer channel using the identified waveform.

Another apparatus for wireless communication is described. The apparatus may include a processor, memory in electronic communication with the processor, and instructions stored in the memory. The instructions may be operable to cause the processor to determine whether an uplink physical layer channel is configured for frequency domain CDM, select a waveform switching mode based at least in part on the determination of whether the physical layer channel is configured for frequency domain CDM, identify a waveform for the physical layer channel based at least in part on the waveform switching mode, and communicate on the physical layer channel using the identified waveform.

A non-transitory computer readable medium for wireless communication is described. The non-transitory computer-readable medium may include instructions operable to cause a processor to determine whether an uplink physical layer channel is configured for frequency domain CDM, select a waveform switching mode based at least in part on the determination of whether the physical layer channel is configured for frequency domain CDM, identify a waveform for the physical layer channel based at least in part on the waveform switching mode, and communicate on the physical layer channel using the identified waveform.

Some examples of the method, apparatus, and non-transitory computer-readable medium described above may further include processes, features, means, or instructions for determining that the uplink physical layer channel may be not configured for frequency domain CDM, where the waveform switching mode includes a switching mode. Some examples of the method, apparatus, and non-transitory computer-readable medium described above may further include processes, features, means, or instructions for switching the waveform for the uplink physical layer channel based at least in part on the switching mode.

Some examples of the method, apparatus, and non-transitory computer-readable medium described above may further include processes, features, means, or instructions for determining that the uplink physical layer channel may be configured for frequency domain CDM, where the waveform switching mode includes a non-switching mode. Some examples of the method, apparatus, and non-transitory computer-readable medium described above may further include processes, features, means, or instructions for maintaining the identified waveform for the uplink physical layer channel based at least in part on the non-switching mode.

In some examples of the method, apparatus, and non-transitory computer-readable medium described above, the uplink physical layer channel includes a physical uplink shared channel (PUSCH). In some examples of the method, apparatus, and non-transitory computer-readable medium described above, the waveform switching mode includes one or more rules for selecting an OFDM waveform or an SC-FDM waveform.

A method of wireless communication is described. The method may include communicating on an uplink physical layer channel using a first waveform, selecting a second waveform based at least in part on one or more waveform switching parameters, and communicating on the uplink physical layer channel using the second waveform.

An apparatus for wireless communication is described. The apparatus may include means for communicating on an uplink physical layer channel using a first waveform, means for selecting a second waveform based at least in part on one or more waveform switching parameters, and means for communicating on the uplink physical layer channel using the second waveform.

Another apparatus for wireless communication is described. The apparatus may include a processor, memory in electronic communication with the processor, and instructions stored in the memory. The instructions may be operable to cause the processor to communicate on an uplink physical layer channel using a first waveform, select a second waveform based at least in part on one or more waveform switching parameters, and communicate on the uplink physical layer channel using the second waveform.

A non-transitory computer readable medium for wireless communication is described. The non-transitory computer-readable medium may include instructions operable to cause a processor to communicate on an uplink physical layer channel using a first waveform, select a second waveform based at least in part on one or more waveform switching parameters, and communicate on the uplink physical layer channel using the second waveform.

Some examples of the method, apparatus, and non-transitory computer-readable medium described above may further include processes, features, means, or instructions for identifying a change in a multiple-input multiple output (MIMO) configuration, where the one or more waveform switching parameters include a parameter based on the MIMO configuration. Some examples of a change in a MIMO configuration may include a change from a MIMO configuration to a single-input multiple output (SIMO) configuration.

Some examples of the method, apparatus, and non-transitory computer-readable medium described above may further include processes, features, means, or instructions for identifying a change in a SIMO configuration, wherein the one or more waveform switching parameters comprise a parameter based on the SIMO configuration. Some examples of a change in a SIMO configuration may include a change from a SIMO configuration to a MIMO configuration.

Some examples of the method, apparatus, and non-transitory computer-readable medium described above may further include processes, features, means, or instructions for identifying a number of channels in a transmission time interval (TTI) of the uplink physical layer channel, where the one or more waveform switching parameters include a parameter based on the number of channels in the TTI.

In some examples of the method, apparatus, and non-transitory computer-readable medium described above, the uplink physical layer channel comprises a PUSCH, and where identifying the number of channels in the TTI comprises: determining that a physical uplink control channel (PUCCH) transmission or a SRS transmission may be scheduled during the TTI. Some examples of the method, apparatus, and non-transitory computer-readable medium described above may further include processes, features, means, or instructions for identifying a change in a Doppler shift of a UE, where the one or more waveform switching parameters comprise a parameter based on the Doppler shift of the UE.

In some examples of the method, apparatus, and non-transitory computer-readable medium described above, communicating on the uplink physical layer channel using the second waveform comprises: communicating using a multi-cluster transmission pattern based at least in part on the change in the Doppler shift. Some examples of the method, apparatus, and non-transitory computer-readable medium described above may further include processes, features, means, or instructions for identifying a change in a link budget of a UE, where one or more waveform switching parameters comprise a parameter based on the link budget of the UE.

In some examples of the method, apparatus, and non-transitory computer readable medium described above, communicating on the uplink physical layer channel using the second waveform comprises: identifying a change in SNR of a user equipment, wherein the one or more waveform switching parameters comprise a parameter based on the SNR of the UE. Some examples of the method, apparatus, and non-transitory computer-readable medium described above may further include processes, features, means, or instructions for identifying a change in an modulation coding scheme (MCS) of a user equipment (UE), wherein the one or more waveform switching parameters comprise a parameter based on the MCS of the UE.

In some examples of the method, apparatus, and non-transitory computer-readable medium described above, the one or more waveform switching parameters comprise at least two of a MIMO configuration, a single-input multiple output (SIMO) configuration, a number of channels, a Doppler shift, and a link budget, a signal to noise ratio (SNR), and a MCS. In some examples of the method, apparatus, and non-transitory computer-readable medium described above, the second waveform may be applied to data transmissions, reference signal transmissions, or both.

In some examples of the method, apparatus, and non-transitory computer-readable medium described above, communicating on the uplink physical layer channel using the first waveform comprises: transmitting a PUSCH during a first symbol of a TTI. In some examples of the method, apparatus, and non-transitory computer-readable medium described above, communicating on the uplink physical layer channel using the second waveform comprises: transmitting the PUSCH during a second symbol of the TTI. Some examples of the method, apparatus, and non-transitory computer-readable medium described above may further include processes, features, means, or instructions for transmitting a SRS during the second symbol of the TTI, where the second symbol of the TTI comprises a last symbol of the TTI.

Some examples of the method, apparatus, and non-transitory computer-readable medium described above may further include processes, features, means, or instructions for transmitting an indication of the second waveform to a UE. Some examples of the method, apparatus, and non-transitory computer-readable medium described above may further include processes, features, means, or instructions for receiving an indication of the second waveform from a base station, where the second waveform may be selected based at least in part on the indication.

Some examples of the method, apparatus, and non-transitory computer-readable medium described above may further include processes, features, means, or instructions for transmitting an indication of the second waveform to a base station. Some examples of the method, apparatus, and non-transitory computer-readable medium described above may further include processes, features, means, or instructions for receiving an indication of the second waveform from a UE, where the second waveform may be selected based at least in part on the indication.

In some examples of the method, apparatus, and non-transitory computer-readable medium described above, the second waveform may be autonomously selected by a UE based at least in part on one or more waveform switching parameters. In some examples of the method, apparatus, and non-transitory computer-readable medium described above, the second waveform may be identified by a base station independently of the UE.

In some examples of the method, apparatus, and non-transitory computer-readable medium described above, the first waveform comprises an OFDM waveform and the second waveform comprises an SC-FDM waveform. In some examples of the method, apparatus, and non-transitory computer-readable medium described above, the first waveform comprises an SC-FDM waveform and the second waveform comprises an OFDM.

DETAILED DESCRIPTION

A wireless communications system may support uplink communication using multiple multiplexing waveforms including SC-FDM waveforms and OFDM waveforms. SC-FDM waveforms may have a lower peak to average power ratio (PAPR), which may be preferred when a device is power limited or link budget limited. Using an SC-FDM waveform may also be appropriate for transmissions using a multi-cluster transmission pattern. However, UEs with a high signal-to-noise ratio (SNR) may prefer to use an OFDM waveform to improve performance. Using an OFDM waveform may also enable support for different reference signal to data ratios.

Thus, UEs and base stations may utilize both waveforms to take advantage of the distinct properties of each waveform type under different circumstances. In some examples, different waveforms may be used for different uplink channels. For example, data channels may use a different waveform than reference signals. In other examples, data and reference signals may be transmitted using the same waveform, but devices may switch between using SC-FDM and OFDM waveforms. In some cases, whether devices switch waveforms may depend on whether switching will affect the orthogonality of multiplexed transmissions. For example, a UE and a base station may choose not to switch waveforms if an uplink channel uses frequency domain code division multiplexing (CDM). In some examples, dynamic switching may occur within a transmission time interval (TTI).

Waveform selection may be based on one or more transmission conditions. For example, a waveform may be selected based on a multiple-input multiple output (MIMO) mode, a number of channels, a link budget, a SNR, or a modulation and coding scheme (MCS), Doppler information, or a combination thereof.

In some examples, physical uplink control channel (PUCCH) and sounding reference signal (SRS) transmissions may use an SC-FDM waveform, while PUSCH transmissions may use a dynamically selected waveform.

In some examples, physical uplink control channel (PUCCH) and sounding reference signal (SRS) transmissions may use an OFDM waveform, while PUSCH transmissions may use a dynamically selected waveform.

Aspects of the disclosure are initially described in the context of a wireless communications system. Examples of channel configurations that support dynamic waveform switching are then described. Further examples illustrate procedures for either UE initiated or base station directed waveform switching. Aspects of the disclosure are further illustrated by and described with reference to apparatus diagrams, system diagrams, and flowcharts that relate to UL channel dynamic waveform switching.

Figure 1:
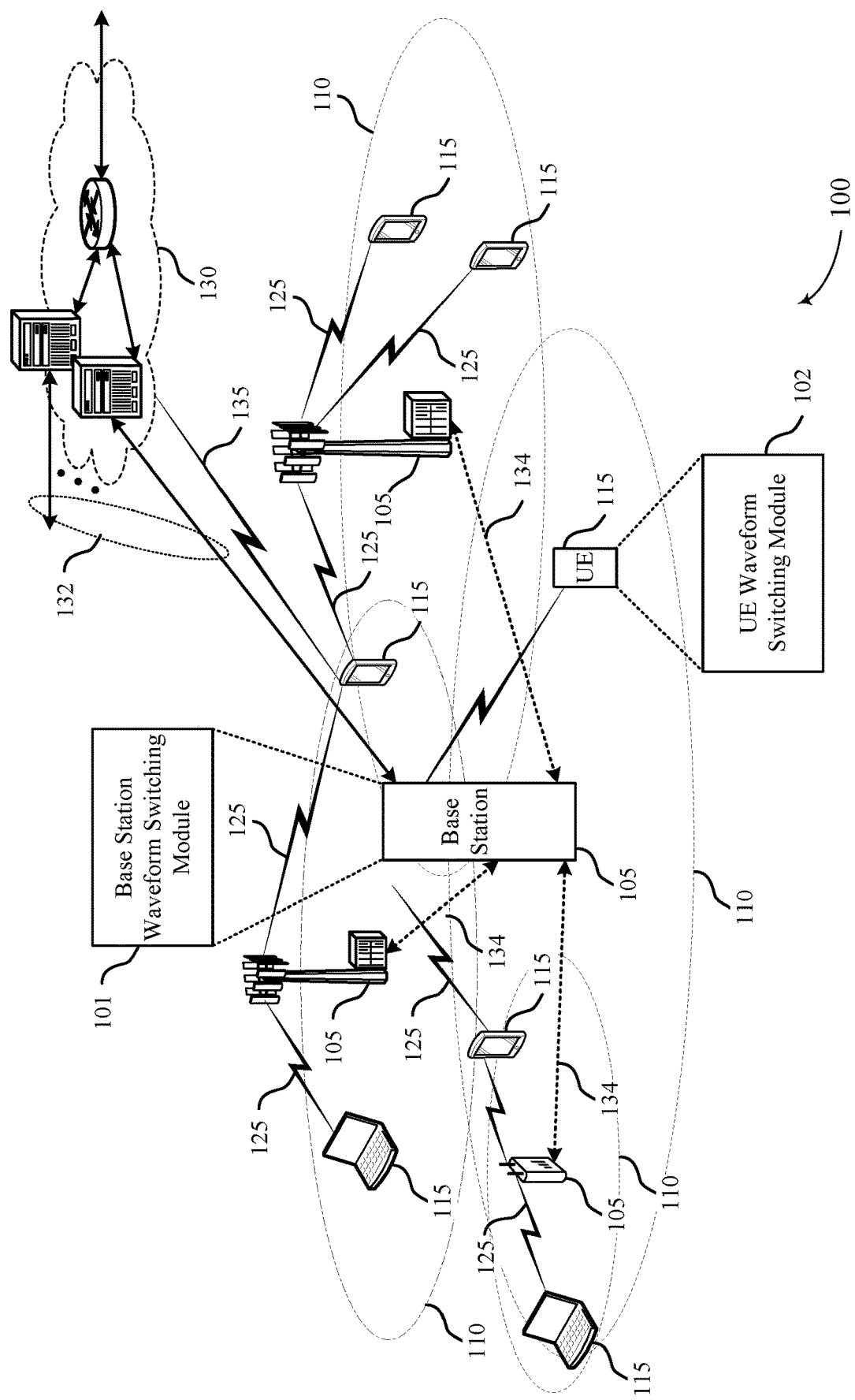
FIGS. 1 and 2 illustrate examples of a system for wireless communication that supports UL channel dynamic waveform switching in accordance with one or more aspects of the present disclosure.

FIG. 1 illustrates an example of a wireless communications system 100 in accordance with various aspects of the present disclosure. The wireless communications system 100 includes base stations 105 (e.g., gNodeBs (gNBs), network access devices, access node controllers (ANCs) and/or radio heads (RHs)), UEs 115, and a core network 130. In some examples, the wireless communications system 100 may be an LTE (or LTE-Advanced) network. In some examples, wireless communications system 100 may support dynamic waveform switching for uplink channels.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or downlink (DL) transmissions, from a base station 105 to a UE 115. A UE 115 may communicate with the core network 130 through communication link 135. UEs 115 may be dispersed throughout the wireless communications system 100, and each UE 115 may be stationary or mobile.

The core network 130 may provide user authentication, access authorization, tracking, Internet Protocol (IP) connectivity, and other access, routing, or mobility functions. At least some of the base stations 105 (e.g., network access devices, gNBs, ANCs, RHs) may interface with the core network 130 through backhaul links 132 (e.g., S1, S2, etc.) with the core network 130 and may perform radio configuration and scheduling for communication with the UEs 115. In various examples, ANCs may communicate, either directly or indirectly (e.g., through core network 130), with each other over backhaul links 134 (e.g., X1, X2, etc.), which may be wired or wireless communication links. Each ANC may additionally or alternatively communicate with a number of UEs 115 through a number of smart radio heads. In an alternative configuration of the wireless communications system 100, the functionality of an ANC may be provided by a radio head or distributed across the radio heads of a gNB.

In some examples, the wireless communications system 100 may include a 5G network. In other examples, the wireless communications system 100 may include a LTE/LTE-A network. The wireless communications system 100 may in some cases be a heterogeneous network, in which different types of base stations 105 (e.g., gNBs, eNBs, ANCs, etc.) provide coverage for various geographical regions. The term "cell" is a 3GPP term that can be used to describe a base station, a radio head, a carrier or component carrier associated with a base station or a radio head, or a coverage area (e.g., sector, etc.) of a carrier or base station, depending on context.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. A UE 115 may communicate with the core network 130 through communication link 135. UEs 115 may be dispersed throughout the wireless communications system 100, and each UE 115 may be stationary or mobile.

A UE 115 may also additionally or alternatively be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may additionally or alternatively be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may include base station waveform switching manager 101 and a UE 115 may include a UE waveform switching manager 102. Base station waveform switching manager 101 and UE waveform switching manager 102 may be examples of aspects of the waveform switching manager described with reference to FIGS. 9-13. Base station waveform switching manager 101 and UE waveform switching manager 102 may determine whether an uplink physical layer channel is configured for frequency domain CDM, select a waveform switching mode based on the determination of whether the physical layer channel is configured for frequency domain CDM, and identify a waveform for the physical layer channel based on the waveform switching mode. Base station waveform switching manager 101 and UE waveform switching manager 102 may also select a second waveform based on one or more waveform switching parameters.

In wireless communications system 100, a UE 115 may communicate with a base station using subframes spanning a given time interval (e.g., 1 ms). The UE 115 may receive packets from a base station 105 over a downlink subframe and transmit packets to a base station 105 over an uplink subframe. A downlink subframe may span an available bandwidth and have symbols allocated for a physical downlink control channel (PDCCH), a physical downlink shared channel (PDSCH), a guard period (GP), and a common burst. An uplink subframe may span the available bandwidth and have symbols allocated for a PDCCH, an uplink burst, a GP, and a common burst. The uplink common burst and uplink burst may include a sounding reference signal (SRS), a physical uplink control channel (PUCCH, or a physical uplink control channel (PUSCH) and the GP may be used when switching from downlink to uplink during a subframe.

A base station 105 and a UE 115 may utilize different waveforms based on different multiplexing schemes. For example, OFDM employs multiple overlapping radio frequency carriers, each operating at a chosen frequency that is orthogonal to the other frequencies to produce a transmission scheme that supports higher bit rates due to parallel channel operation. OFDMA is a multiple access scheme relying on the use of OFDM, where individual subcarriers (or groups of subcarriers) are assigned to distinct users.

SC-FDM uses an additional Fourier transform processing operation (as compared to OFDM) to combine multiple subcarriers into a single SC-FDM symbol. Thus, unlike OFDM, in SC-FDM the signal modulated onto a given subcarrier is a linear combination (typically via a discrete fourier transform (DFT) precoding operation) of multiple data symbols. In some cases, all the transmitted subcarriers of an SC-FDMA signal carry a component of each modulated data symbol. This gives SC-FDMA its single-carrier property, which results in the lower Cubic Metric (CM) and Peak to Average Power Ratio (PAPR). In some cases, a UE 115 or a base station 105 may switch between using OFDM and SC-FDM waveforms to take advantage of the properties of both techniques.

Other multiplexing schemes may also be used in addition, or as an alternative, to OFDM and SC-FDM. For example, CDM may be based on applying different orthogonal cover codes to multiplexed transmissions. An orthogonal cover code may be applied either in the frequency domain or in the time domain.

A PUCCH may be used for uplink acknowledgements (ACKs), scheduling requests (SRs) and channel quality information (CQI) and other uplink control information. A PUCCH may be mapped to a control channel defined by a code and two consecutive resource blocks. Uplink control signaling may depend on the presence of timing synchronization for a cell. PUCCH resources for SR and CQI reporting may be assigned (and revoked) through radio resource control (RRC) signaling. In some cases, resources for SR may be assigned after acquiring synchronization through a random access channel (RACH) procedure. In other cases, an SR may not be assigned to a UE 115 through the RACH (i.e., synchronized UEs may or may not have a dedicated SR channel). PUCCH resources for SR and CQI may be lost when the UE is no longer synchronized. A PUSCH may be the LTE uplink physical channel carrying scheduled data traffic, and control signaling if some is required to be transmitted in the same subframe.

In some cases, a UE may transmit an uplink channel such as a PUSCH, a PUCCH, an SRS, or an ultra-reliable low-latency communications channel (URLCC) to a base station 105 over a single uplink subframe. In other examples, multiple UEs may be capable of transmitting different uplink channels over the same uplink subframe. Different channels may be transmitted according to different waveforms (e.g., an SC-FDM waveform, an OFDM waveform, or the like). Different channels may be multiplexed with different multiplexing techniques such as frequency division multiplexing (FDM), time division multiplexing (TDM), CDM, or spatial division multiplexing (SDM), among others types of multiplexing.

A UE 115 may be configured to collaboratively communicate with multiple base stations 105 through, for example, Multiple Input Multiple Output (MIMO), Coordinated Multi-Point (CoMP), or other schemes. MIMO techniques use multiple antennas on the base stations or multiple antennas on the UE to take advantage of multipath environments to transmit multiple data streams. CoMP includes techniques for dynamic coordination of transmission and reception by a number of eNBs to improve overall transmission quality for UEs as well as increasing network and spectrum utilization. Some MIMO configurations (i.e., multi-user (MU) MIMO) may be used to multiplex different UEs 115. Other configurations (i.e., single user (SU) MIMO) may be based on communication with a single UE 115.

Data communicated between a UE 115 and a base station 105 may be divided into logical channels, transport channels, and physical layer channels. Channels may also be classified into Control Channels and Traffic Channels. Logical control channels may include paging control channel (PCCH) for paging information, broadcast control channel (BCCH) for broadcast system control information, multicast control channel (MCCH) for transmitting multimedia broadcast multicast services (MBMS) scheduling and control information, dedicated control channel (DCCH) for transmitting dedicated control information, common control channel (CCCH) for random access information, dedicated traffic channel (DTCH) for dedicated UE data, and machine type communication (MTC), for multicast data. DL transport channels may include broadcast channel (BCH) for broadcast information, a downlink shared channel (DL-SCH) for data transfer, paging channel (PCH) for paging information, and multicast channel (MCH) for multicast transmissions. UL transport channels may include RACH for access and UL-SCH for data.

DL physical channels may include physical broadcast channel (PBCH) for broadcast information, physical control format indicator channel (PCFICH) for control format information, physical downlink control channel (PDCCH) for control and scheduling information, physical hybrid ARQ indicator channel (PHICH) for hybrid automatic repeat request (HARD) status messages, physical downlink shared channel (PDSCH) for user data and physical multicast channel (PMCH) for multicast data. UL physical channels may include PRACH for access messages, physical uplink control channel (PUCCH) for control data, and physical uplink shared channel (PUSCH) for user data.

An SRS may be transmitted by UE 115 using a predetermined sequence (e.g., a Zadoff-Chu sequence) so that a base station 105 may estimate the uplink channel quality. An SRS transmission may not be associated with transmission of data on another channel, and may be transmitted periodically on a wide bandwidth (e.g., a bandwidth including more subcarriers than are allocated for uplink data transmission). In some examples, multiple SRSs from the same or different UEs may span varying bandwidths and number of symbols in an uplink subframe.

An SRS may also be scheduled on multiple antenna ports and may still be considered a single SRS transmission. An SRS transmission may be categorized as a Type 0 (periodically transmitted at equally spaced intervals) SRS or as a Type 1 (aperiodic) SRS. Thus, data gathered by a base station 105 from an SRS may be used to inform an uplink scheduler. A base station 105 may also utilize an SRS to check timing alignment status and send time alignment commands to the UE 115.

Wireless communications system 100 may operate in an ultra high frequency (UHF) frequency region using frequency bands from 700 MHz to 2600 MHz (2.6 GHz), although in some cases wireless local area network (WLAN) networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum.

In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, according to the present disclosure, a UE 115 and a base station 105 may support switching from one waveform to another on uplink channels. For example, a UE 115 and a base station 105 may utilize both frequency SC-FDM waveform and an OFDM waveforms based on channel conditions and other factors. In some examples, a UE 115 may switch for some uplink channels, and use a single waveform for other channels. For example, switching waveforms for channels that utilize frequency domain CDM channel may interrupt the orthogonality of multiplexed transmissions. A UE 115 may transition from one waveform to another either autonomously or based on an explicit indication from a base station. If a UE 115 switches autonomously, it may send an indication of the transition to the serving base station.

Figure 2:
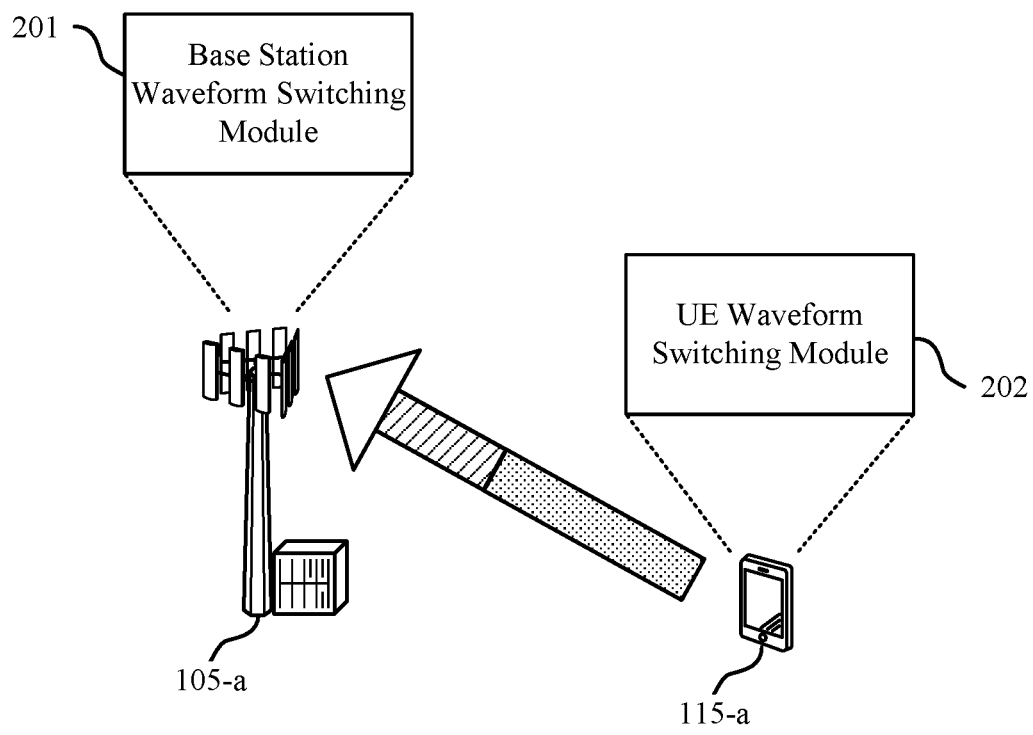

FIG. 2 illustrates an example of a wireless communications system 200 for UL channel dynamic waveform switching in accordance with one or more aspects of the present disclosure. Wireless communications system 200 may include UE 115-*a* and base station 105-*a*, which may be examples of a UE 115 and a base station 105 of FIG. 1. UE 115-*a* may switch waveforms of an uplink channel (e.g., PUSCH) while communicating with base station 105-*a*. For example, UE 115-*a* may switch from using an SC-FDM waveform to an OFDM waveform or from an OFDM waveform to an SC-FDM waveform.

Base station 105-*a* may include base station waveform switching manager 201 and UE 115-*a* may include a UE waveform switching manager 202. Base station waveform switching manager 201 and UE waveform switching manager 202 may be examples of aspects of the waveform switching manager described with reference to FIG. 1 and FIGS. 9-13. Base station waveform switching manager 201 and UE waveform switching manager 202 may determine whether an uplink physical layer channel is configured for frequency domain CDM, select a waveform switching mode based on the determination of whether the physical layer channel is configured for frequency domain CDM, and identify a waveform for the physical layer channel based on the waveform switching mode. Base station waveform switching manager 201 and UE waveform switching manager 202 may also select a second waveform based on one or more waveform switching parameters.

Wireless communications system 200 may support uplink communication using SC-FDM, OFDM, or both. SC-FDM waveforms may have a lower peak to average power ratio (PAPR), which may be preferred in some circumstances. For example, communicating using an SC-FDM waveform may be more appropriate for link budget limited UEs 115. Using an SC-FDM waveform may also be appropriate for transmissions using a multi-cluster transmission pattern. However, UEs 115 with a high signal-to-noise ratio (SNR) may prefer to use an OFDM waveform. Using an OFDM waveform may also enable support for different reference signal to data ratios. In some examples, data and reference signals may be transmitted using the same waveform, but the UEs 115 and base stations 105 may switch between using SC-FDM and OFDM waveforms. In another example, data and reference signals may be transmitted using different waveforms.

In some cases, UE 115-*a* and base station 105-*a* may decide whether to switch waveforms based on how switching may affect the orthogonality of transmissions. Specifically, UE 115-*a* and base station 105-*a* may choose not to switch wave forms depending on if an uplink channel uses frequency domain CDM. However, if a channel CDM in the time domain (e.g., a Walsh cover), UE 115-*a* may switch waveforms without interfering with the orthogonality of the CDM. That is, UE 115-*a* and base station 105-*a* may dynamically switch waveforms if time domain spreading is maintained.

In some examples, dynamic switching may occur within a TTI, such as during a regular burst of PUSCH. For example, different symbols in the regular burst may use different waveforms. Some symbols of the PUSCH regular burst may use OFDM, and some symbols of the PUSCH regular burst may use SC-FDM. In some cases, switching waveforms in PUSCH may not affect a waveform of a PUCCH or a waveform of an SRS if they are CDMed in frequency domain.

Selecting the waveform type may be based on one or more transmission conditions. For example, SC-FDM or OFDM waveform selection may be based on a MIMO mode, a number of channels, a link budget, a SNR, or a modulation and coding scheme (MCS), Doppler information, or a combination thereof. In some of these examples, PUCCH and SRS transmissions may use an SC-FDM waveform and a localized transmission pattern. The waveform for reference signals and data symbols may be independent of each other, and the waveform switching may also be independent. For example, a waveform for data symbols may switch, but a waveform for reference signal symbols may stay the same.

In a first example, waveform switching may be based on a MIMO mode in PUSCH. For example, if UE 115-*a* and base station 105-*a* are configured for single-input, multiple-output (SIMO) mode communication, UE 115-*a* may transmit an SC-FDM waveform, or UE 115-*a* may transmit data using an SC-FDM waveform and reference signals with an OFDM waveform. If UE 115-*a* and base station 105-*a* are communicating using a multi-user (MU) MIMO (MU-MIMO) configuration, UE 115-*a* and base station 105-*a* may communicate on PUSCH using an SC-FDM or a OFDM waveform. If UE 115-*a* and base station 105-*a* are communicating using a single user (SU) MIMO (SU-MIMO) configuration, UE 115-*a* and base station 105-*a* may communicate on PUSCH using an SC-FDM or OFDM waveform. Each MIMO mode may use a different waveform, so the waveform may switch if the MIMO mode changes. In some examples, a change in MIMO mode may include a change from a SIMO configuration to a MIMO configuration, or a change from a MIMO configuration to a SIMO configuration. A change in MIMO mode may also include a change from a MU-MIMO configuration to a SU-MIMO configuration, or a change from a SU-MIMO configuration to a MU-MIMO configuration, or any combination of changes from one of the above mentioned configurations a different one of the above mentioned configurations.

In another example, waveform switching may be based on a number of channels UE 115-*a* and base station use to communicate. If UE 115-*a* and base station 105-*a* are communicating only on PUSCH, UE 115-*a* and base station 105-*a* may communicate on PUSCH using and an SC-FDM waveform. However, switching may occur when PUSCH is transmitted with another channel. In some examples, in a MU-MIMO configuration, UE 115-*a* and base station 105-*a* may communicate on PUSCH using an SC-FDM waveform. In a SIMO or SU-MIMO configuration, UE 115-*a* and base station 105-*a* may communicate on PUSCH using an OFDM waveform. PUCCH and SRS waveforms may continue to be SC-FDM or OFDM while the waveform for PUSCH communication switches.

Waveform switching may also be based on a link budget or an MCS. If UE 115-*a* is link budget limited, or has a low SNR, or has a low MCS, UE 115-*a* and base station 105-*a* may communicate on an uplink channel using an SC-FDM waveform. If UE 115-*a* is high SNR, UE 115-*a* may transmit data using an OFDM waveform and transmit reference signals with an SC-FDM waveform or an OFDM waveform. Switching may occur when the link budget of UE 115-*a* changes. For example, if UE 115-*a* moves toward base station 105-*a*, UE 115-*a* and base station 105-*a* may switch from an OFDM waveform to an SC-FDM waveform. For link budget and MCS based switching, PUCCH and SRS may use a SC-FDM waveform.

In another example, waveform switching may be based on a Doppler shift. For example, if UE 115-*a* has a low Doppler shift, UE 115-*a* may use an SC-FDM waveform for PUSCH. High Doppler shift UEs 115 may use a multi-cluster transmission pattern. High Doppler shift UEs 115 may transmit data using an OFDM or SC-FDM waveform and transmit reference signals with an OFDM waveform. In some cases, SRS may not be frequent enough for base station 105-*a* to choose a preferred band. Multi-cluster transmission patterns may provide frequency diversity and be more robust against insufficient SRS. Transmitting reference signals using an OFDM waveform may allow for more reference signal symbols to track channel variation while balancing a reference signal to data ratio. Switching may occur when a Doppler shift of UE 115-*a* changes.

Waveform switching may also be based on a combination, or hybrid, of any of the above examples or configurations. For example, the waveform switch may be based on a number of channels and a MIMO mode. In some cases, UE 115-*a* and base station 105-*a* may be configured for MU-MIMO transmission and may use an SC-FDM waveform. If UE 115-*a* and base station 105-*a* are configured for SU-MIMO transmission, UE 115-*a* and base station 105-*a* may use either an OFDM waveform, and transmit reference signals using an OFDM or SC-FDM waveform. UE 115-*a* and base station 105-*a* may only switch waveforms if UE 115-*a* is configured for SIMO communication. If communicating on a single channel, UE 115-*a* and base station 105-*a* may transmit data on an SC-FDM waveform, and transmit reference signals using an SC-FDM or OFDM waveform. If communicating on multiple channels, UE 115-*a* and base station 105-*a* transmit data using an OFDM waveform, and reference signal transmissions may switch waveforms or may not switch waveforms. PUCCH and SRS transmission may use an SC-FDM waveform.

A second hybrid waveform switching configuration may be based on a link budget and a MIMO type. In a second hybrid waveform switching configuration, link budget limited and low MCS UEs 115 may use an SC-FDM waveform. In some examples, the link budget limited and low MCS UEs 115 may be configured for SIMO transmission. High SNR UEs 115 configured for MU-MIMO transmission may use an SC-FDM waveform. High SNR UEs 115 configured for SU-MIMO transmission may use an OFDM waveform and transmit reference signals using and OFDM waveform or an SC-FDM waveform. Switching may occur for high SNR UEs 115 configured for SIMO transmission. For a UE 115 communicating on a single channel, the UE 115 and base station 105 may transmit data using an SC-FDM waveform, and transmit reference signals using an SC-FDM or OFDM waveform. For a UE 115 communicating on multiple channels, the UE 115 and base station 105 may transmit data using an OFDM waveform, and the reference signal waveform may or may not switch waveforms. UE 115-*a* and base station 105-*a* may use SC-FDM waveform for PUCCH.

Thus, in another hybrid waveform switching configuration, waveform switching may be based on a link budget, a MIMO mode, and Doppler information. Link budget limited and low MCS UEs 115 may use a localized SC-FDM waveform, and the waveform determination may not be based on a MIMO mode or Doppler information. High SNR, high Doppler shift UEs 115 may transmit data transmission using an OFDM or SC-FDM waveform, and reference signals using OFDM waveforms. High SNR, low Doppler UEs 115 configured for MU-MIMO transmission may use an SC-FDM waveform. High SNR, low Doppler UEs 115 configured for SU-MIMO transmission may OFDM waveform and transmit reference signals using an OFDM or SC-FDM waveform. Switching waveforms may occur for high SNR, low Doppler UEs 115 configured for SIMO transmission. A UE transmission on one channel may transmit data using an SC-FDM waveform, and transmit reference signals using an SC-FDM or OFDM waveform. PUCCH and SRS may use an SC-FDM waveform.

Either UE 115-*a* or base station 105-*a* may initiate a waveform switch. If base station 105-*a* to initiates the switch, base station 105-*a* may indicate this to UE 115-*a* (e.g., through an explicit grant). If UE 115-*a* initiates the waveform switch, UE 115-*a* may indicate the switch to base station 105-*a* by adding or setting a bit in a transmission. UE 115-*a* may also switch waveforms without sending an explicit indication to base station 105-*a*. In this case, UE 115-*a* and base station 105-*a* may switch based on mutually identifiable conditions. For example, with link budget based switching, UE 115-*a* may switch waveforms at a certain MCS. For Doppler based switching, base station 105-*a* and UE 115-*a* may first sync Doppler information prior to switching.

UE 115-*a* may be able to switch waveforms based on a number of channels without synchronizing channel information with the base station. When CQI and SRS are transmitted, the CQI and SRs may indicate channel information which be used to identify the switch at both UE 115-*a* and base station 105-*a*. In some cases, ambiguity may arise based on scheduling requests (SRs) and acknowledgement (ACK) transmissions. An SR transmission may be random at base station 105-*a*, and ACK transmissions may be missing at UE 115-*a* while being expected at base station 105-*a*. In some examples, the waveform may switch if UE 115-*a* has the opportunity to transmit on more than one UL channel. In one example, base station 105-*a* may blindly detect SRs and ACKs from UE 115-*a*, which may indicate the number of channels. Base station 105-*a* may decode the SR/ACK first and use an OFDM waveform to decode PUSCH if transmission of the SR/ACK is detected. In another example, the waveform may only switch when CQI and SRS are transmitted together with PUSCH.

Figure 3A:
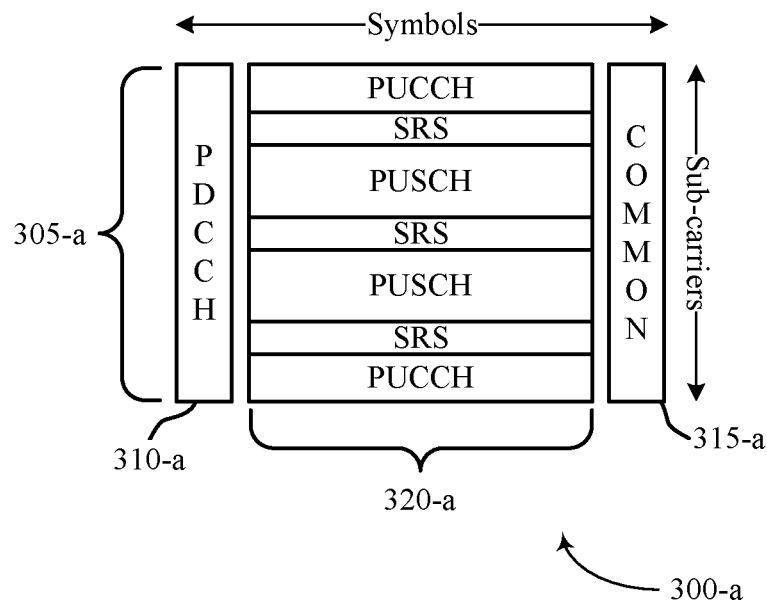
FIGS. 3A and 3B illustrate example channel structures that support uplink channel multiplexing and waveform selection in accordance with one or more aspects of the present disclosure.

FIG. 3A illustrates an example of a channel structure 300-*a* for uplink channel multiplexing and waveform selection according to one or more aspects of the present disclosure. As shown, channel structure 300-*a* is representative of an uplink subframe spanning a number of symbols in time and a number of sub-carriers in frequency. The number of sub-carriers span an available bandwidth 305-*a*.

A portion of the number of symbols is allocated for a PDCCH 310-*a* and a portion of the number of symbols is also allocated for a common uplink burst 315-*a*. The remainder of the number of symbols is allocated for uplink burst 320-*a* over which a number of channels for a UE may be transmitted. As shown in this example, bandwidth 305-*a* is divided into a number of different channel regions in the uplink burst 320-*a*, which includes multiple PUCCH, PUSCH, and SRS channels spanning the entire number of symbols allocated for the uplink burst 320-*a*. Here, FDM is used to divide each of the channels. In other words, each channel spans a given number of sub-carriers of the bandwidth 305-*a*. In some examples, different waveforms may be selected for the multiple channels. For example, SC-FDM may be selected for one or more of the SRSs and OFDM may be selected for one or more of the PUSCHs. The multiple channels are also shown in a given pattern spanning the bandwidth 305-*a* and each channel is disjoint from the other channels in frequency. Though one pattern of channels is shown, any number of channels in any pattern may be considered without departing from the scope of the present disclosure.

Figure 3B:
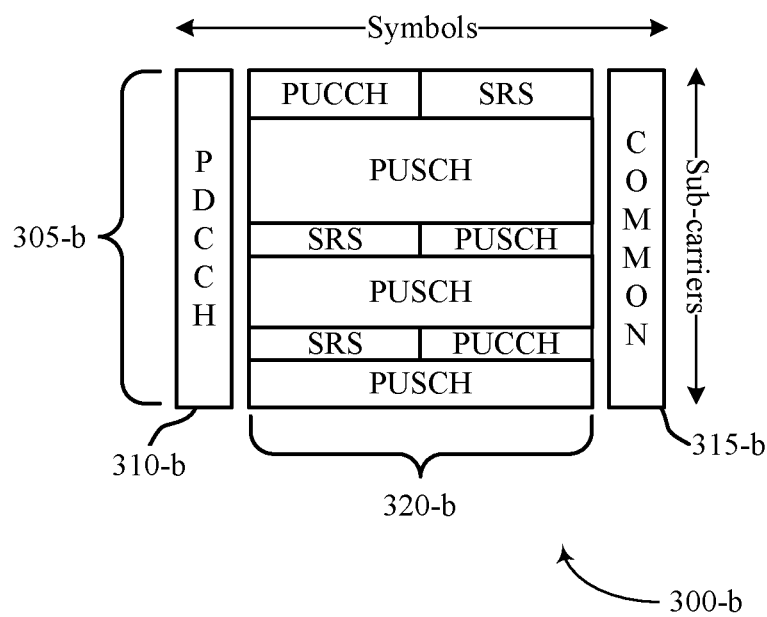

FIG. 3B illustrates an example of a channel structure 300-*b* for uplink channel multiplexing and waveform selection according to one or more aspects of the present disclosure. As shown, channel structure 300-*b* is representative of an uplink subframe spanning a number of symbols in time and a number of sub-carriers in frequency. The number of sub-carriers span an available bandwidth 305-*b*.

As in FIG. 3A, a portion of the number of symbols is allocated for a PDCCH 310-*b* and a portion of the number of symbols is also allocated for a common uplink burst 315-*b*. The remainder of the number of symbols is allocated for uplink burst 320-*b* over which a number of channels for a UE may be transmitted. As shown in this example, bandwidth 305-*b* is divided into a number of different channel regions in the uplink burst 320-*b*, which includes multiple PUCCH, PUSCH, and SRS channels spanning the entire number of symbols allocated for the uplink burst 320-*b*. Here, FDM and TDM is used to divide each of the channels. In other words, each channel spans a given number of sub-carriers of the bandwidth 305-*a* and may also span only a portion of the symbols allocated for the uplink burst 320-*b*. In some examples, CDM or SDM may be used to multiplex the same channel types of different UEs in the same frequency band. For example, different Chu sequence shifts may be used to CDM PUCCH of different UEs in the same resource block. In some examples, different waveforms may be selected for the multiple channels. For example, SC-FDM may be selected for one or more of the SRSs and OFDM may be selected for one or more of the PUSCHs. The multiple channels are also shown in a given pattern spanning the bandwidth 305-*a* and each channel is disjoint from the other channels in frequency, while some channels are also disjointed in time. For example, an SRS and a PUSCH both span the same sub-carriers but different symbols in time. Though one pattern of channels is shown in this FDM and TDM division, any number of channels in any pattern may be considered without departing from the scope of the present disclosure.

Figure 4A:
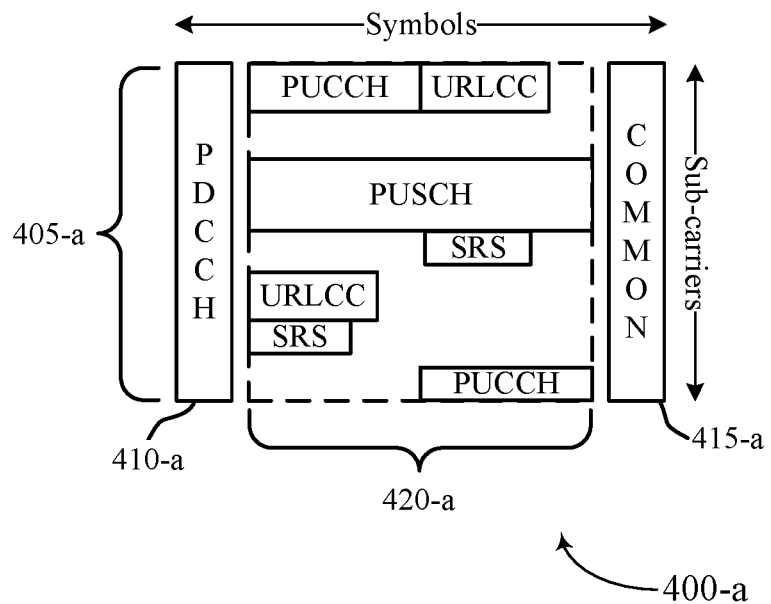
FIGS. 4A and 4B illustrate example channel structures that support uplink channel multiplexing and waveform selection in accordance with one or more aspects of the present disclosure.

FIG. 4A illustrates an example of a channel structure 400-*a* for uplink channel multiplexing and waveform selection according to one or more aspects of the present disclosure. As shown, channel structure 400-*a* is representative of an uplink subframe spanning a number of symbols in time and a number of sub-carriers in frequency. The number of sub-carriers span an available bandwidth 405-*a*.

A portion of the number of symbols is allocated for a PDCCH 410-*a* and a portion of the number of symbols is also allocated for a common uplink burst 415-*a*. The remainder of the number of symbols is allocated for uplink burst 420-*a* over which a number of channels for a UE may be transmitted. As shown in this example, multiple channels including a PUCCH, a PUSCH, a URLCC, and an SRS span varying sub-carriers and symbols in the uplink burst 420-*a*. In some examples, different waveforms may be selected for the multiple channels. For example, SC-FDM may be selected for one or more of the SRSs and OFDM may be selected for one or more of the PUSCHs.

Figure 4B:
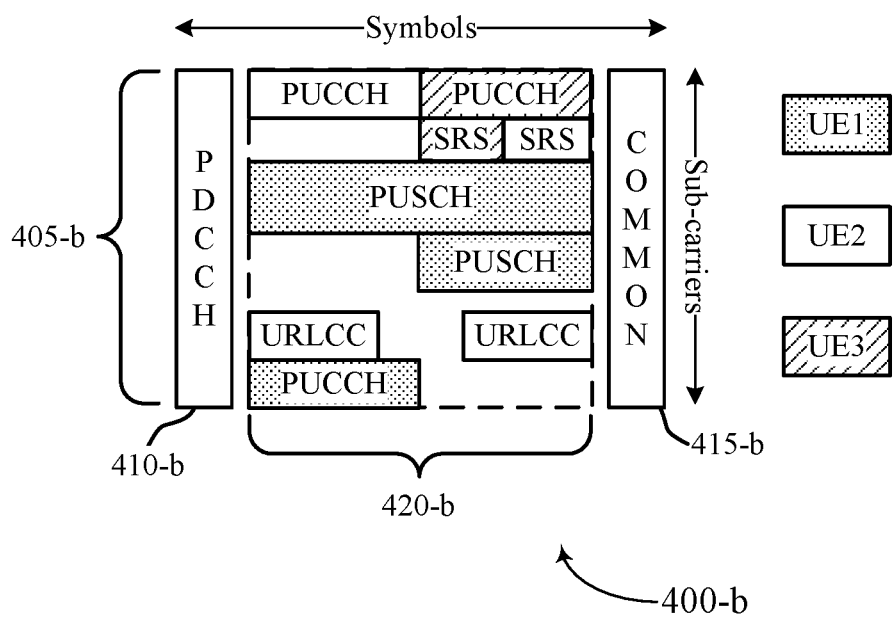

In FIG. 4A, each channel is from the same UE, however, according to this pattern, some symbols and sub-carriers within the uplink burst 420-*a* are unused. Accordingly, as shown in FIG. 4B, multiple UEs may be multiplexed in a single uplink burst. FIG. 4B illustrates an example of a channel structure 400-*b* for uplink channel multiplexing and waveform selection according to one or more aspects of the present disclosure. As shown, channel structure 400-*b* is representative of an uplink subframe spanning a number of symbols in time and a number of sub-carriers in frequency. The number of sub-carriers span an available bandwidth 405-*b*.

As in FIG. 4A, a portion of the number of symbols is allocated for a PDCCH 410-*b* and a portion of the number of symbols is also allocated for a common uplink burst 415-*b*. The remainder of the number of symbols is allocated for uplink burst 420-*b* over which a number of channels for multiple UEs 115 may be transmitted. As shown in this example, multiple PUCCH, PUSCH, URLCC, and SRS channels span varying bandwidths and symbols. Further, multiple channels for multiple UEs 115 (UE1, UE2, and UE3) are multiplexed within the uplink burst 420-*b*. In some examples, different waveforms may be selected for multiple channels or for different UEs 115. For example, SC-FDM may be selected for UE1 PUCCH, and OFDM may be selected for UE3 SRS.

The multiple channels are also shown in a given pattern over the bandwidth 405-*b* and each channel spans varying subcarriers in frequency and symbols in time. Though one pattern of channels is shown, any number of channels in any pattern may be considered without departing from the scope of the present disclosure.

Figure 5:
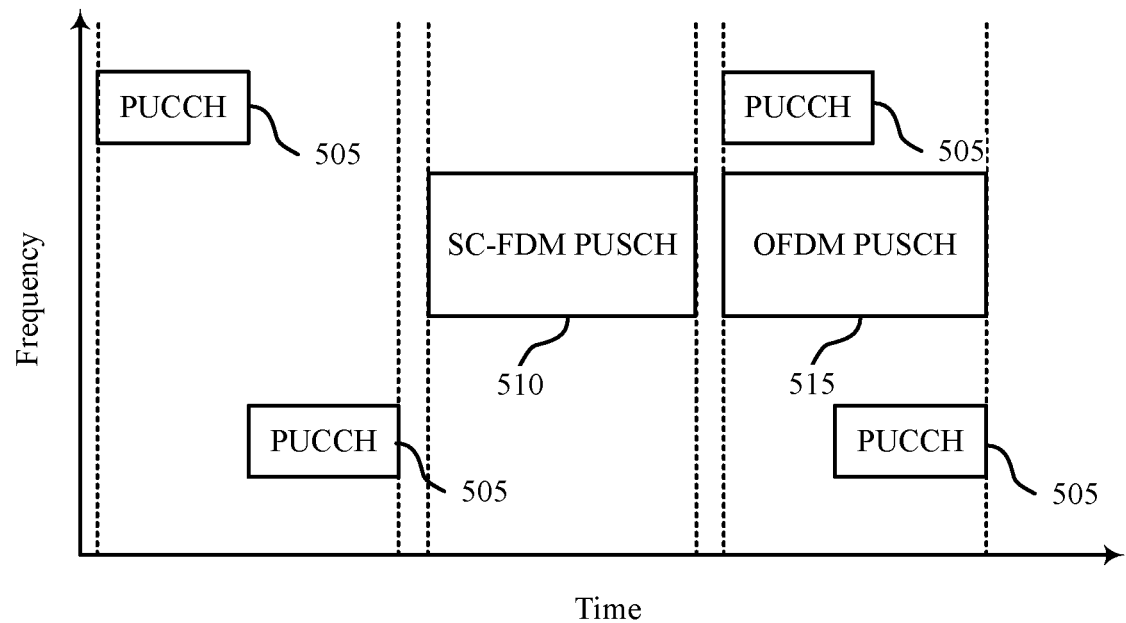
FIG. 5 illustrates an example of a waveform switch that supports UL channel dynamic waveform switching in accordance with one or more aspects of the present disclosure.

FIG. 5 illustrates an example of a waveform switch 500 for UL channel dynamic waveform switching in accordance with one or more aspects of the present disclosure. Waveform switch 500 may represent an example of uplink communication between a base station 105 and a UE 115 of FIGS. 1-2. The UE 115 and/or base station 105 may determine a switching mode and switch a waveform of an uplink channel (e.g., PUSCH) based on the switching mode. Specifically, waveform switch 500 represents an example in which begins transmitting PUSCH 510 with an SC-FDM waveform and then transitions to using an OFDM waveform for PUSCH 515 due to the presence of PUCCH transmission 505.

A UE 115 may transmit a PUCCH transmission 505 using a first waveform and transmission pattern. For example, the waveform may be transmitted using an SC-FDM waveform. The UE 115 may then transmit on a PUSCH 510 using the first waveform. For example, the UE 115 may transmit on the PUSCH 510 using an SC-FDM waveform. In other examples, UE 115 may transmit the PUSCH 510 using an OFDM waveform. In some examples, the UE 115 may decide to switch based on whether the uplink channel is configured for frequency domain CDM. If the UE 115 decides to switch, the UE 115 may decide a second waveform based on one or more waveform switching parameters. For example, the waveform switching parameters may be a MIMO mode, a number of channels, a link budget, or Doppler information. In some examples, the second waveform may be the same as the first waveform, as the UE 115 may decide not to switch.

The UE 115 may then switch waveforms and transmit on a PUSCH 515 using a second waveform. In some cases, both the base station 105 and the UE 115 may identify the switch, and in some cases the UE 115 may switch without indicating the switch to the base station 105. The second waveform may be an SC-FDM waveform or an OFDM waveform.

Figure 6:
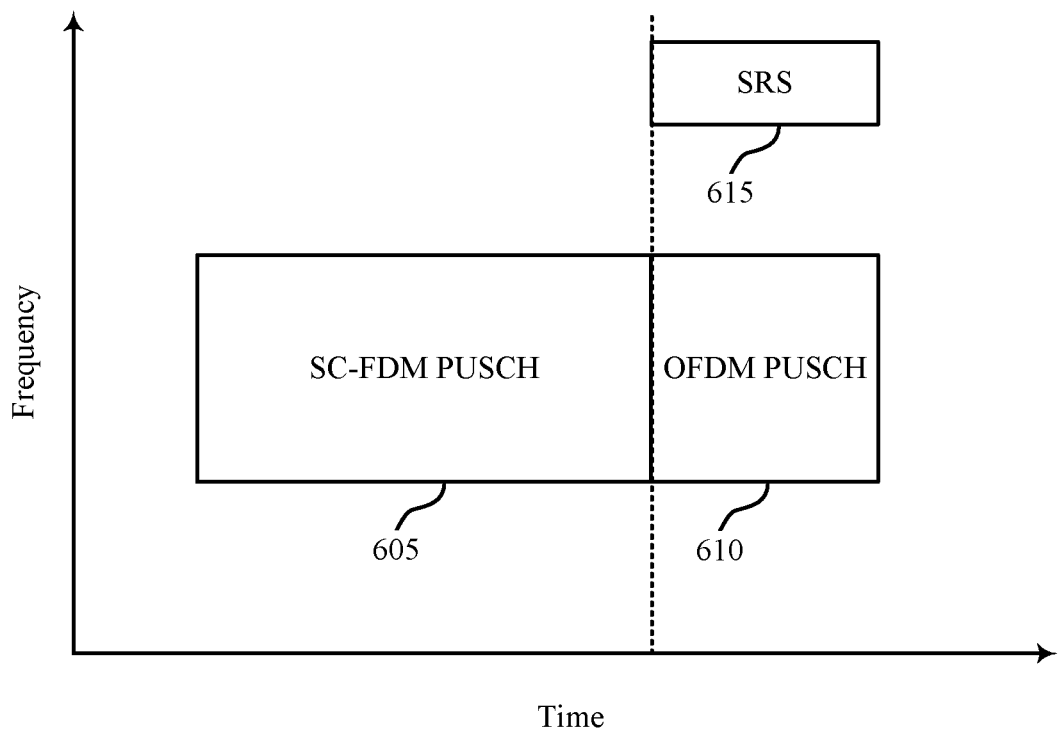
FIG. 6 illustrates an example of a waveform switch in a TTI that supports UL channel dynamic waveform switching in accordance with one or more aspects of the present disclosure.

FIG. 6 illustrates an example of a waveform switch in a TTI 600 for UL channel dynamic waveform switching in accordance with one or more aspects of the present disclosure. Waveform switch in a TTI 600 may include a base station 105 and a UE 115 of FIGS. 1-5. The UE 115 may switch waveforms during a TTI. For example, the UE 115 may switch waveforms at the end of a TTI. Or, the UE 115 may switch after a symbol within the TTI such that some symbols of the TTI use a first waveform and some symbols of the TTI use a second waveform. Specifically, waveform switch in a TTI 600 represents an example in which begins transmitting PUSCH symbols 605 with an SC-FDM waveform and then transitions to using an OFDM waveform for a PUSCH symbols 610 due to the presence of SRS 615.

The UE 115 may transmit a first set of PUSCH symbols 605 using a first waveform. The first waveform may be, for example, SC-FDM or OFDM. In some examples, the UE 115 may decide to switch based on whether the uplink channel is configured for frequency domain CDM. If the UE 115 decides to switch, the UE 115 may decide a second waveform based on one or more waveform switching parameters. For example, the waveform switching parameters may be a MIMO mode, a number of channels, a link budget, a SNR, a MCS, or Doppler information. In some examples, the second waveform may be the same as the first waveform, as the UE 115 may decide not to switch.

The UE 115 may transmit a second PUSCH symbols 610 using the second waveform. In some examples, the UE 115 may transmit the second PUSCH symbols at the end of a TTI or after a symbol within the TTI. For example, if the first PUSCH symbols 605 and the second PUSCH symbols 610 make up a subframe, some symbols of the subframe (e.g., the first PUSCH symbols 605) may be transmitted using the first waveform, and some symbols of the subframe (e.g., the second PUSCH symbols 610) may be transmitted using the second waveform.

The UE 115 may also transmit an SRS 615. The SRS 615 may be transmitted using a waveform (e.g., SC-FDM) which may not be affected by the PUSCH waveform switching. That is, although the PUSCH waveform may switch, the waveform of the SRS 615 may not switch. Switching the waveform of the PUSCH may also not affect the orthogonality of the PUSCH with the SRS 615 or affect the orthogonality of the SRS of the UE 115 with an SRS of another UE 115.

Figure 7:
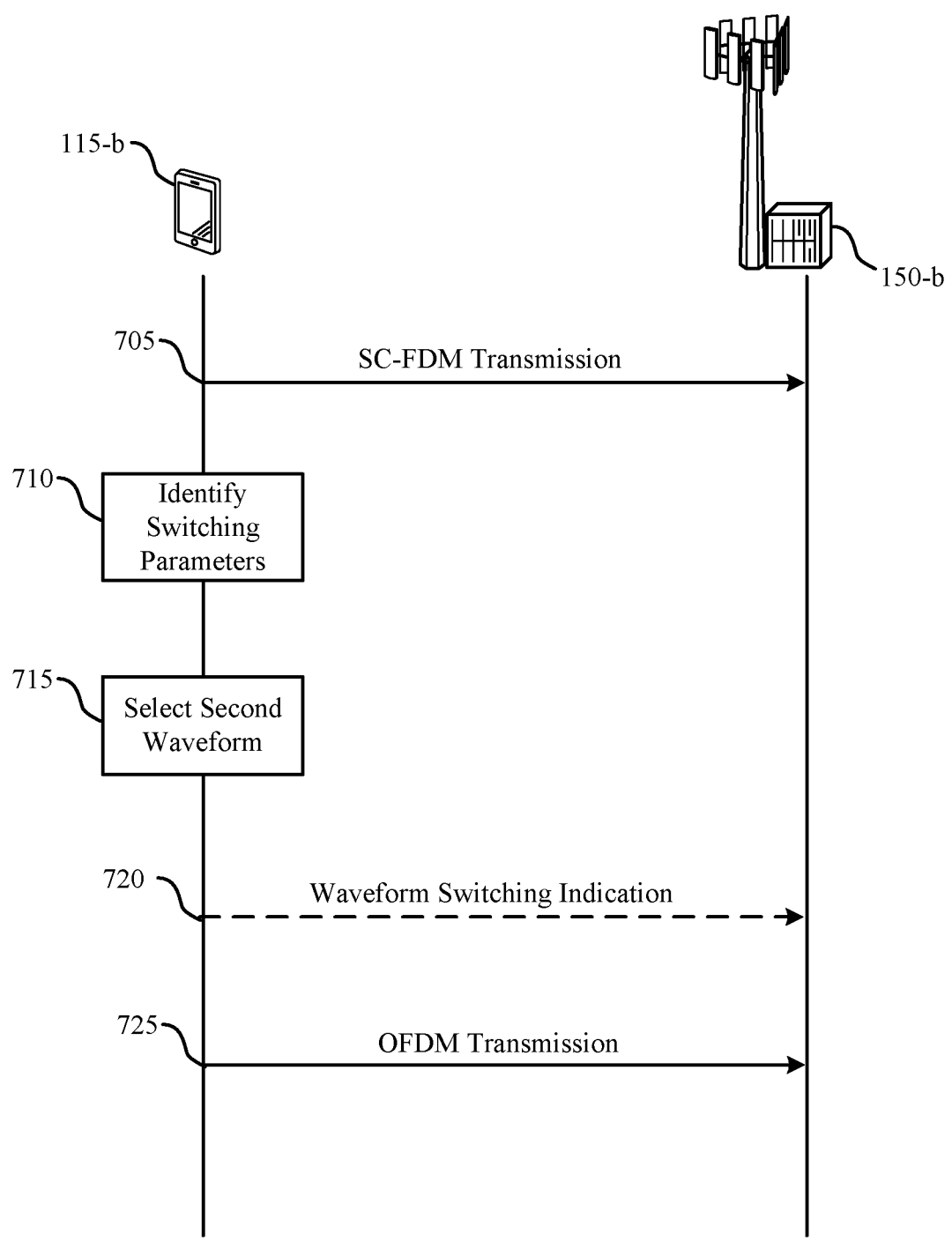
FIGS. 7 and 8 show examples of process flow diagrams that support UL channel dynamic waveform switching in accordance with one or more aspects of the present disclosure.

FIG. 7 illustrates an example of a process flow 700 for UL channel dynamic waveform switching in accordance with various aspects of the present disclosure. The process flow 700 may include operations performed by UE 115-b and base station 105-b, which may be examples of a UE 115 and a base station 105 described herein with reference to FIGS. 1-6. Process flow 700 represents an example in which UE 115-b autonomously switches from using one waveform to another.

At operation 705, UE 115-b and base station 105-b may communicate on an uplink channel (e.g., PUSCH) using a first waveform. In some cases, the waveform may be an SC-FDM waveform (as illustrated) or it may also be an OFDM waveform. In some cases, UE 115-b may also select a switching mode based on whether the channel uses frequency domain CDM. That is, if the channel uses frequency domain CDM it may not perform the operations of process flow 700.

At operation 710, UE 115-b may identify one or more switching parameters as described herein. For example, the switching parameters may include a MIMO mode, a number of channels, a link budget, or Doppler information.

At operation 715, UE 115-b may autonomously select a second waveform based on one or more of the switching parameters. That is, UE 115-b may select the second waveform without receiving an explicit switching indication from base station 105-b.

In some cases, at operation 720, UE 115-b may transmit a waveform switching indication to base station 105-b. That is, after determining that a switch is appropriate, UE 115-b may indicate this to base station 105-b. However, in some cases, UE 115-b may not indicate the switch to base station 105-b. Instead, both UE 115-b and base station 105-b may identify the switch independently based on mutually identifiable parameters.

At operation 725, UE 115-b and base station 105-b may communicate on the uplink channel using the second waveform. For example, UE 115-b may transmit PUSCH using an SC-FDM waveform after previously using an SC-FDM waveform.

Figure 8:
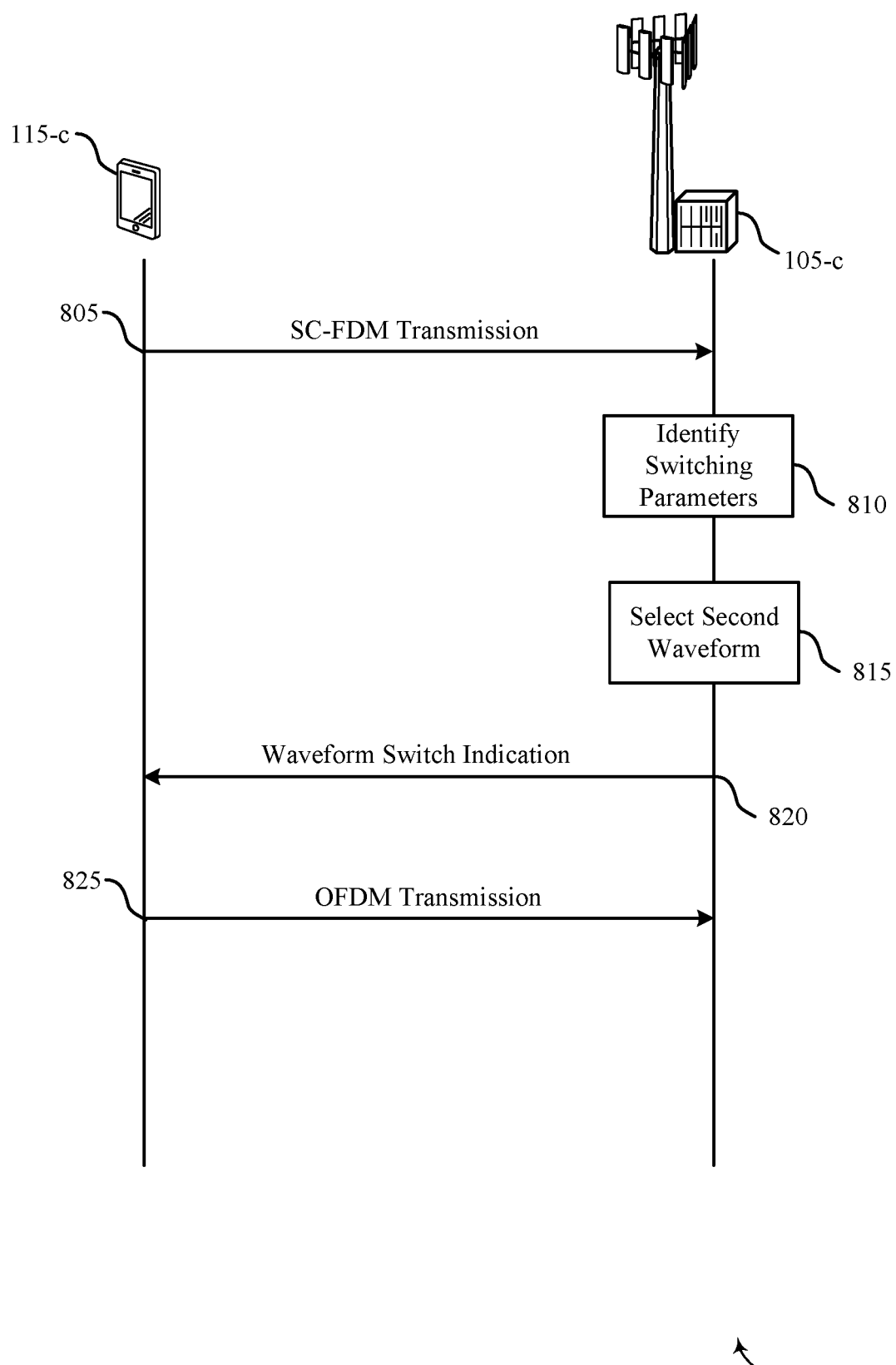

FIG. 8 illustrates an example of a process flow 800 for UL channel dynamic waveform switching in accordance with various aspects of the present disclosure. The process flow 800 may include operations performed by UE 115-c and base station 105-c, which may be examples of a UE 115 and a base station 105 described herein with reference to FIGS. 1-5. Process flow 800 represents an example in which UE 115-c switches from using one waveform to another after receiving an explicit indication from base station 105-c.

At operation 805, UE 115-c and base station 105-c may communicate on an uplink channel (e.g., PUSCH) using a first waveform. In some cases, the waveform may be an SC-FDM waveform (as illustrated) or it may also be an OFDM waveform. In some cases, UE 115-b may also select a switching mode based on whether the channel uses frequency domain CDM. That is, if the channel uses frequency domain CDM it may not perform the operations of process flow 800.

At operation 810, base station 105-c may identify one or more determine switching parameters. For example, the switching parameters may include a MIMO mode, a number (or type) of channels being transmitted, a link budget, or Doppler information.

At operation 815, base station 105-c may select a second waveform based on the switching parameters as described herein. In some cases, the second waveform may be the same as the first waveform used to communicate in operation 805. However, in some cases, the second waveform may be different from that used in operation 805 (e.g., UE 115-c and base station 105-c may transition from using an SC-FDM waveform to using an OFDM waveform).

At operation 820, base station 105-c may transmit a waveform switching indication to UE 115-c. The waveform switching indication may be an explicit indication so that UE 115-c knows which waveform to use when communicating on the uplink channel.

At operation 825, UE 115-c and base station 105-c may communicate on the uplink channel using the second waveform. For example, UE 115-c may transmit PUSCH using an OFDM waveform after previously transmitting the channel using SC-FDM.

Figure 9:
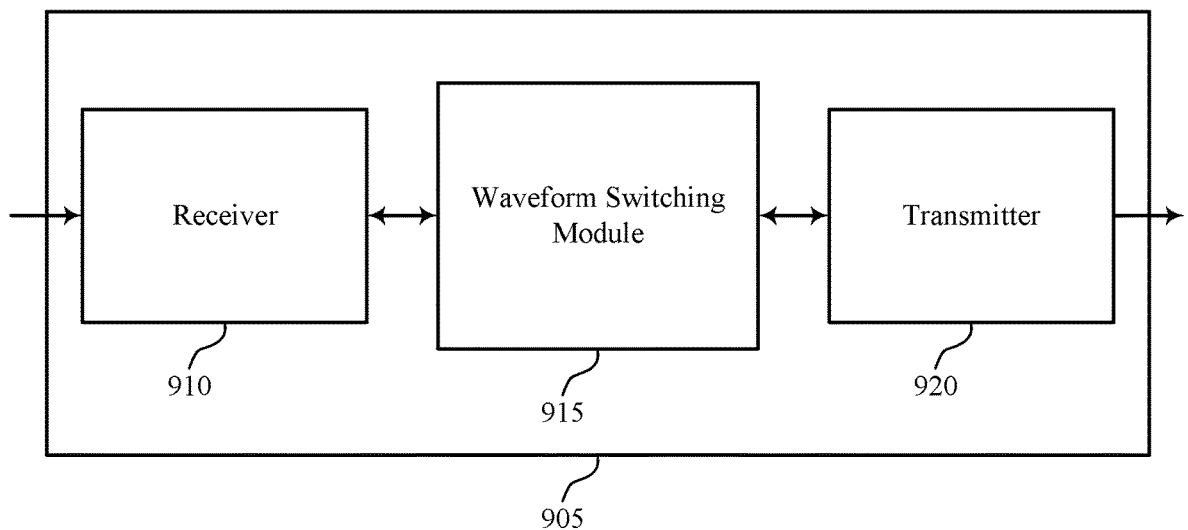
FIGS. 9 through 11 show block diagrams of a device that supports UL channel dynamic waveform switching in accordance with one or more aspects of the present disclosure.

FIG. 9 shows a block diagram 900 of a wireless device 905 that supports UL channel dynamic waveform switching in accordance with various aspects of the present disclosure. Wireless device 905 may be an example of aspects of a UE 115 or base station 105 as described with reference to FIG. 1. Wireless device 905 may include receiver 910, waveform switching manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to UL channel dynamic waveform switching, etc.). Information may be passed on to other components of the device. The receiver 910 may be an example of aspects of the transceiver 1235 described with reference to FIG. 12. Receiver 910 may communicate on communicate on an uplink physical layer channel using a first waveform, and communicate on the uplink physical layer channel using the second waveform.

Waveform switching manager 915 may be an example of aspects of the waveform switching manager 1215 described with reference to FIG. 12. Waveform switching manager 915 may determine whether an uplink physical layer channel is configured for frequency domain CDM, select a waveform switching mode based on the determination of whether the physical layer channel is configured for frequency domain CDM, and identify a waveform for the physical layer channel based on the waveform switching mode. The waveform switching manager 915 may also select a second waveform based on one or more waveform switching parameters.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas.

Transmitter 920 may communicate on communicate on an uplink physical layer channel using a first waveform, and communicate on the uplink physical layer channel using the second waveform. In some cases, communicating on the uplink physical layer channel using the first waveform includes: transmitting a physical uplink shared channel (PUSCH) during a first symbol of a TTI. In some cases, communicating on the uplink physical layer channel using the second waveform includes: transmitting the PUSCH during a second symbol of the TTI. In some cases, the first waveform includes an OFDM waveform and the second waveform includes a SC-FDM waveform. In some cases, the first waveform includes a SC-FDM waveform and the second waveform includes an OFDM.

Figure 10:
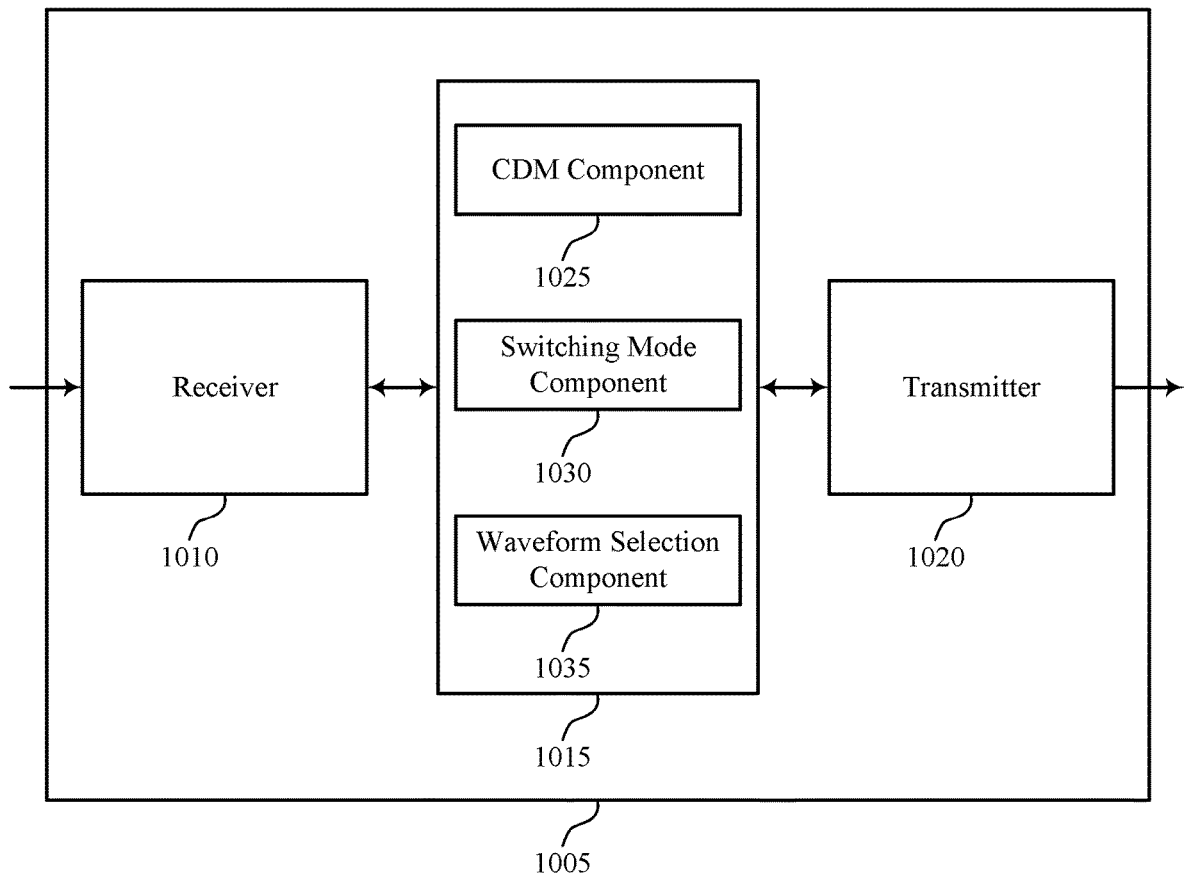

FIG. 10 shows a block diagram 1000 of a wireless device 1005 that supports UL channel dynamic waveform switching in accordance with various aspects of the present disclosure. Wireless device 1005 may be an example of aspects of a wireless device 905 or a UE 115 or base station 105 as described with reference to FIGS. 1 and 9. Wireless device 1005 may include receiver 1010, waveform switching manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to UL channel dynamic waveform switching, etc.). Information may be passed on to other components of the device. The receiver 1010 may be an example of aspects of the transceiver 1235 described with reference to FIG. 12.

Waveform switching manager 1015 may be an example of aspects of the waveform switching manager 1215 described with reference to FIG. 12. Waveform switching manager 1015 may also include CDM component 1025, switching mode component 1030, and waveform selection component 1035.

CDM component 1025 may determine whether an uplink physical layer channel is configured for frequency domain CDM. For example, CDM component 1025 may determine that the uplink physical layer channel is not configured for frequency domain CDM, where the waveform switching mode includes a switching mode, and determine that the uplink physical layer channel is configured for frequency domain CDM, where the waveform switching mode includes a non-switching mode. In some cases, the uplink physical layer channel includes a PUSCH.

Switching mode component 1030 may select a waveform switching mode. In some cases the waveform switching mode may be based on the determination of whether the physical layer channel is configured for frequency domain CDM. In some cases, the waveform switching mode includes one or more rules for selecting an OFDM waveform or a SC-FDM waveform.

Waveform selection component 1035 may identify a waveform for the physical layer channel based on the waveform switching mode, switch the waveform for the uplink physical layer channel based on the switching mode, maintain the identified waveform for the uplink physical layer channel based on the non-switching mode, and select a second waveform based on one or more waveform switching parameters.

In some cases, the one or more waveform switching parameters include at least two of a MIMO configuration, a number of channels, a Doppler shift, and a link budget, a SNR, or a MCS. In some cases, the second waveform is applied to data transmissions, reference signal transmissions, or both. In some cases, the second waveform is autonomously selected by a UE based on one or more waveform switching parameters. In some cases, the second waveform is identified by a base station independently of the UE.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas.

Figure 11:
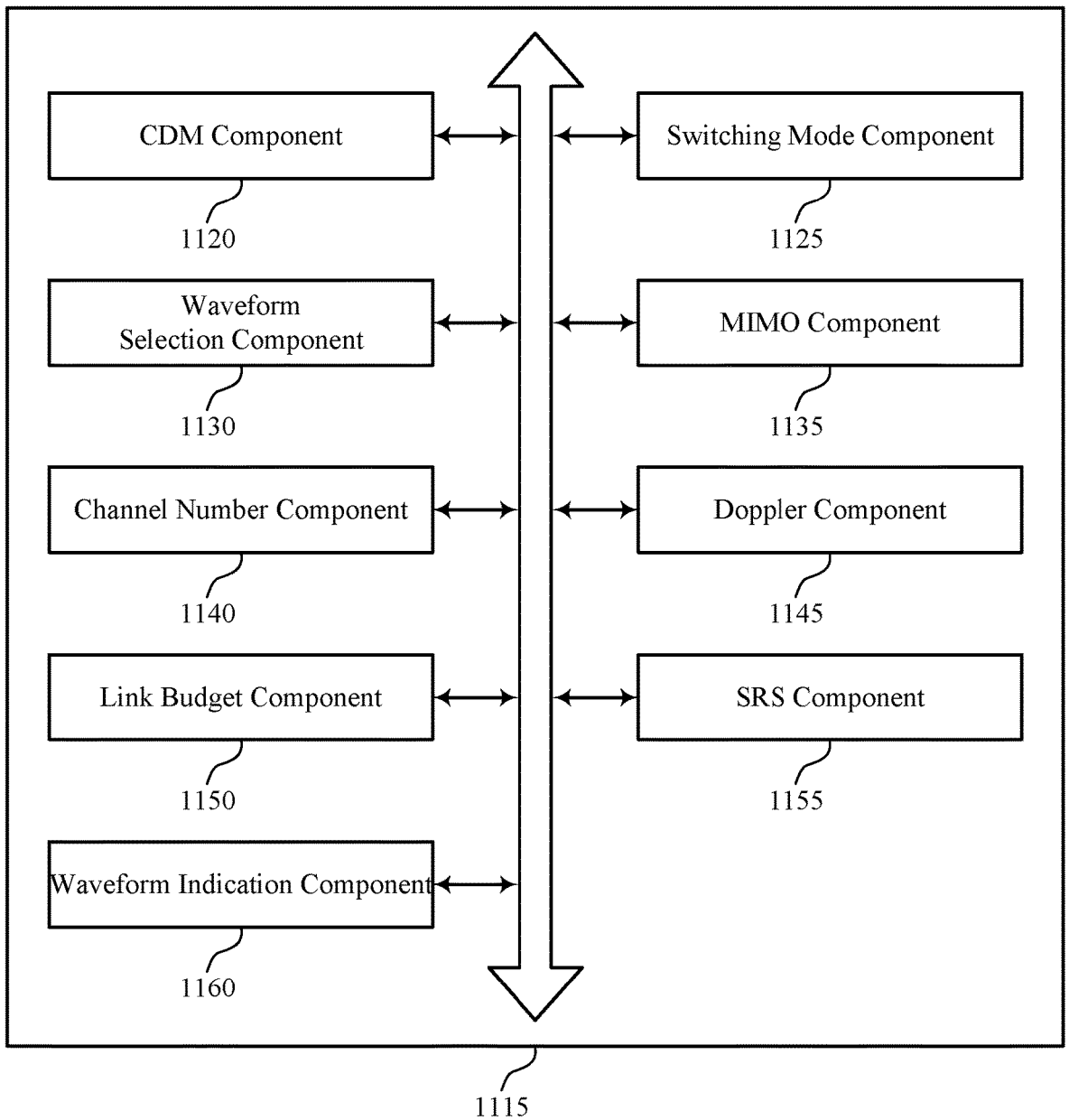

FIG. 11 shows a block diagram 1100 of a waveform switching manager 1115 that supports UL channel dynamic waveform switching in accordance with various aspects of the present disclosure. The waveform switching manager 1115 may be an example of aspects of a waveform switching manager 915, a waveform switching manager 1015, or a waveform switching manager 1215 described with reference to FIGS. 9, 10, and 12. The waveform switching manager 1115 may include CDM component 1120, switching mode component 1125, waveform selection component 1130, MIMO component 1135, channel number component 1140, Doppler component 1145, link budget component 1150, sounding reference signal (SRS) component 1155, and waveform indication component 1160. Each of these modules may communicate, directly or indirectly, with one another (e.g., via one or more buses).

CDM component 1120 may determine whether an uplink physical layer channel is configured for frequency domain CDM, for example, CDM component 1120 may determine that the uplink physical layer channel is not configured for frequency domain CDM, where the waveform switching mode includes a switching mode, and determine that the uplink physical layer channel is configured for frequency domain CDM, where the waveform switching mode includes a non-switching mode.

Additionally or alternatively, switching mode component 1125 may select a waveform switching mode. Waveform selection component 1130 may identify a waveform for the physical layer channel based on the waveform switching mode, switch the waveform for the uplink physical layer channel based on the switching mode, maintain the identified waveform for the uplink physical layer channel based on the non-switching mode, and select a second waveform based on one or more waveform switching parameters.

MIMO component 1135 may identify a change in a MIMO configuration, where the one or more waveform switching parameters include a parameter based on the MIMO configuration.

Channel number component 1140 may identify a number of channels in a TTI of the uplink physical layer channel, where the one or more waveform switching parameters include a parameter based on the number of channels in the TTI. In some cases, the uplink physical layer channel includes a PUSCH, and where identifying the number of channels in the TTI includes: determining that a PUCCH transmission or a SRS transmission is scheduled during the TTI.

Doppler component 1145 may identify a change in a Doppler shift of a UE, where the one or more waveform switching parameters include a parameter based on the Doppler shift of the UE. In some cases, communicating on the uplink physical layer channel using the second waveform includes: communicating using a multi-cluster transmission pattern based on the change in the Doppler shift.

Link budget component 1150 may identify a change in a link budget of a UE, where one or more waveform switching parameters includes a parameter based on the link budget of the UE. In some examples, the link budget may be an SNR of a UE, or an MCS of a UE. Thus, in some cases, link budget component 1150 may also identify a change in SNR of a UE, or a change in MCS of a UE. SRS component 1155 may transmit a SRS during the second symbol of the TTI, where the second symbol of the TTI includes a last symbol of the TTI.

Waveform indication component 1160 may receive an indication of the second waveform from a base station, where the second waveform is selected based on the indication, receive an indication of the second waveform from a UE, where the second waveform is selected based on the indication, transmit an indication of the second waveform to a UE, and transmit an indication of the second waveform to a base station.

Figure 12:
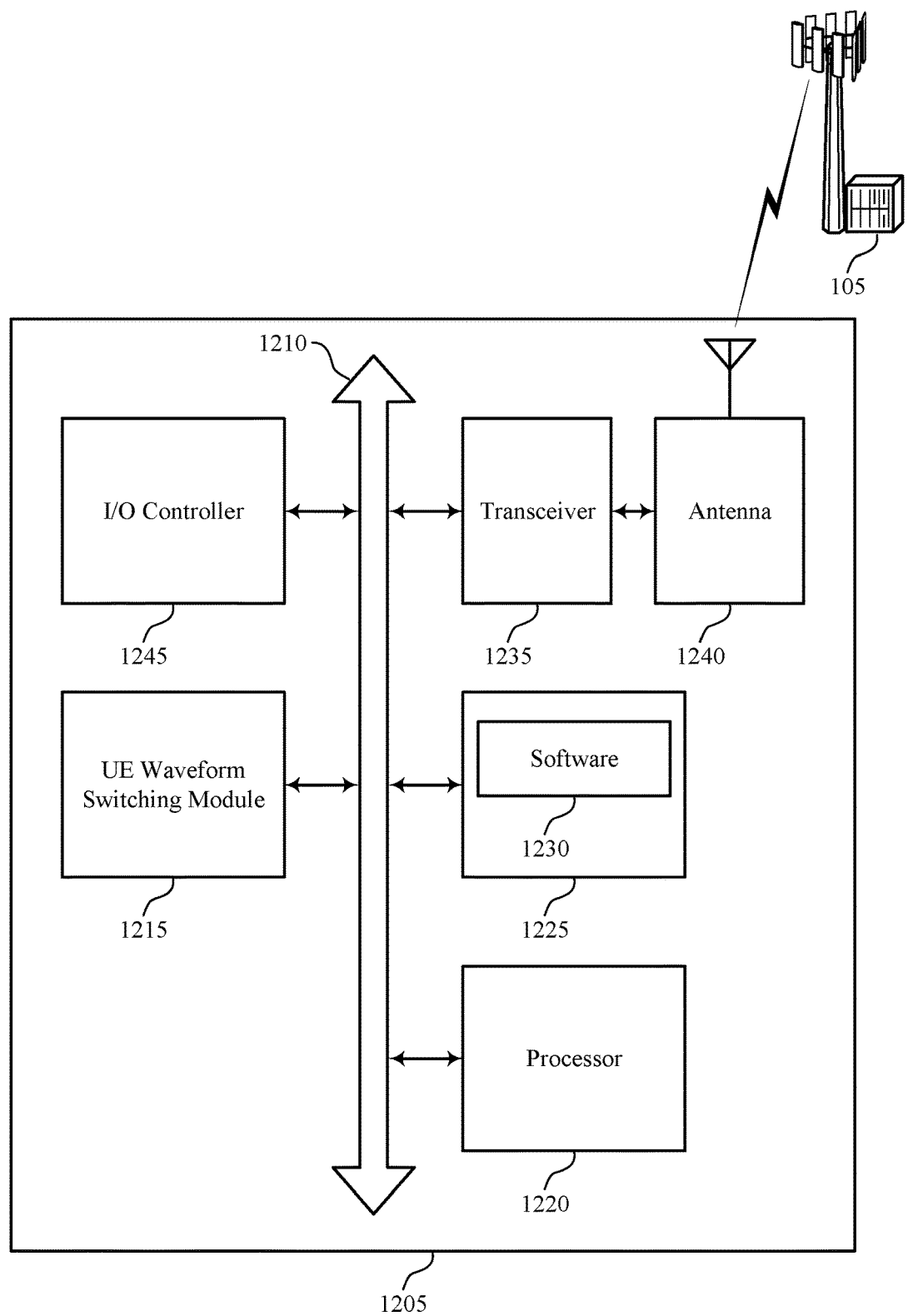
FIG. 12 illustrates a block diagram of a system including a UE that supports UL channel dynamic waveform switching in accordance with one or more aspects of the present disclosure.

FIG. 12 shows a diagram of a system 1200 including a device 1205 that supports UL channel dynamic waveform switching in accordance with various aspects of the present disclosure. Device 1205 may be an example of or include the components of wireless device 905, wireless device 1005, or a UE 115 as described above, e.g., with reference to FIGS. 1, 9 and 10. Device 1205 may include components for bi-directional voice and data communications including components for transmitting and receiving communications, including UE waveform switching manager 1215, processor 1220, memory 1225, software 1230, transceiver 1235, antenna 1240, and I/O controller 1245. These components may be in electronic communication via one or more busses (e.g., bus 1210). Device 1205 may communicate wirelessly with one or more base stations 105.

Processor 1220 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting UL channel dynamic waveform switching).1220.

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware and/or software operation such as the interaction with peripheral components or devices.

Software 1230 may include code to implement aspects of the present disclosure, including code to support UL channel dynamic waveform switching. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system.

Figure 13:
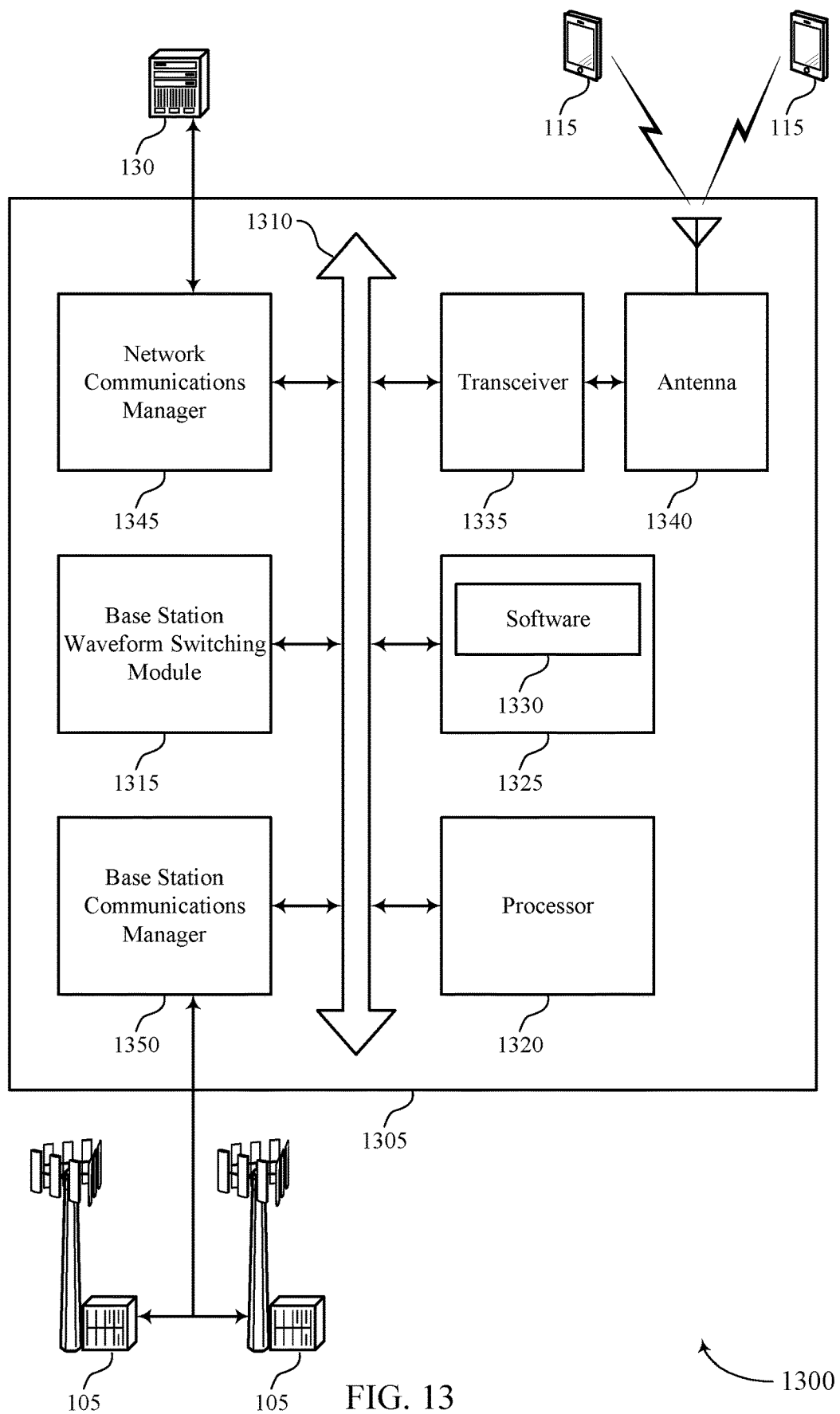
FIG. 13 illustrates a block diagram of a system including a base station that supports UL channel dynamic waveform switching in accordance with one or more aspects of the present disclosure.

FIG. 13 shows a diagram of a system 1300 including a device 1305 that supports UL channel dynamic waveform switching in accordance with various aspects of the present disclosure. Device 1305 may be an example of or include the components of wireless device 1005, wireless device 1105, or a base station 105 as described above, e.g., with reference to FIGS. 1, 10 and 11. Device 1305 may include components for bi-directional voice and data communications including components for transmitting and receiving communications, including base station waveform switching manager 1315, processor 1320, memory 1325, software 1330, transceiver 1335, antenna 1340, network communications manager 1345, and base station communications manager 1350. These components may be in electronic communication via one or more busses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting UL channel dynamic waveform switching).1320.

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware and/or software operation such as the interaction with peripheral components or devices.

Software 1330 may include code to implement aspects of the present disclosure, including code to support UL channel dynamic waveform switching. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Base station communications manager 1350 may manage communications with other base station 105, and may include a controller or scheduler for controlling communications with UEs 115 in cooperation with other base stations 105. For example, the base station communications manager 1350 may coordinate scheduling for transmissions to UEs 115 for various interference mitigation techniques such as beamforming or joint transmission. In some examples, base station communications manager 1350 may provide an X2 interface within an LTE/LTE-A wireless communication network technology to provide communication between base stations 105.

Figure 14:
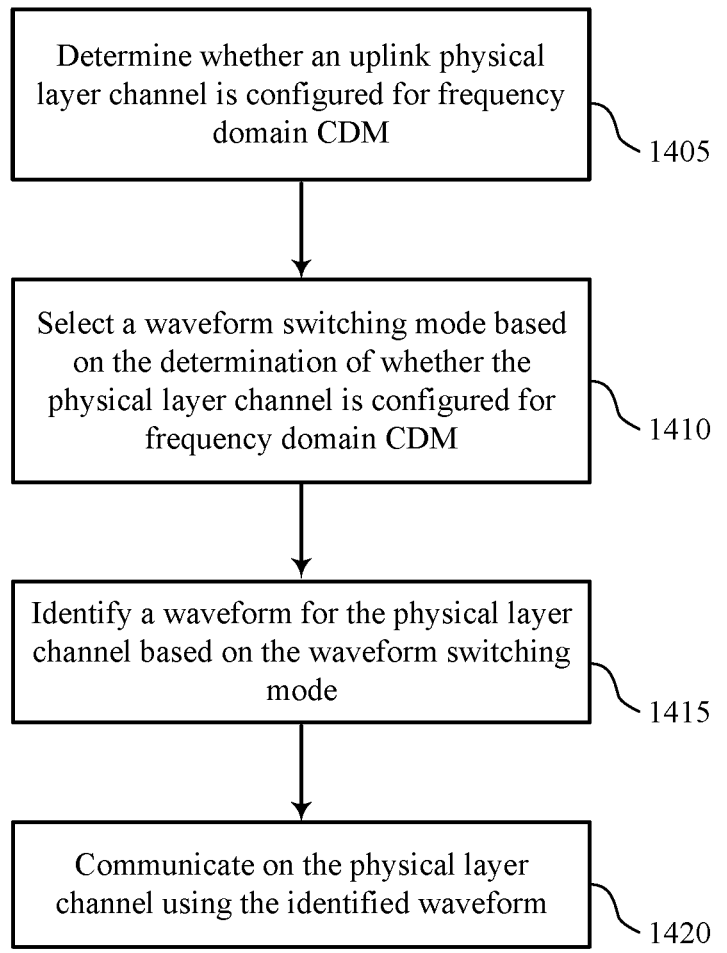
FIGS. 14 through 21 illustrate methods for UL channel dynamic waveform switching in accordance with one or more aspects of the present disclosure.

FIG. 14 shows a flowchart illustrating a method 1400 for UL channel dynamic waveform switching in accordance with various aspects of the present disclosure. The operations of method 1400 may be implemented by a UE 115 or base station 105 or its components as described herein. For example, the operations of method 1400 may be performed by a waveform switching manager as described with reference to FIGS. 9 through 11. In some examples, a UE 115 or base station 105 may execute a set of codes to control the functional elements of the device to perform the functions described below. Additionally or alternatively, the UE 115 or base station 105 may perform aspects the functions described below using special-purpose hardware.

At block 1405 the UE 115 or base station 105 may determine whether an uplink physical layer channel is configured for frequency domain CDM. The operations of block 1405 may be performed according to the methods described with reference to FIGS. 1 through 6. In certain examples, aspects of the operations of block 1405 may be performed by a CDM component as described with reference to FIGS. 9 through 11.

At block 1410 the UE 115 or base station 105 may select a waveform switching mode based at least in part on the determination of whether the physical layer channel is configured for frequency domain CDM. The operations of block 1410 may be performed according to the methods described with reference to FIGS. 1 through 6. In certain examples, aspects of the operations of block 1410 may be performed by a switching mode component as described with reference to FIGS. 9 through 11.

At block 1415 the UE 115 or base station 105 may identify a waveform for the physical layer channel based at least in part on the waveform switching mode. The operations of block 1415 may be performed according to the methods described with reference to FIGS. 1 through 6. In certain examples, aspects of the operations of block 1415 may be performed by a waveform selection component as described with reference to FIGS. 9 through 11.

At block 1420 the UE 115 or base station 105 may communicate on the physical layer channel using the identified waveform. The operations of block 1420 may be performed according to the methods described with reference to FIGS. 1 through 6. In certain examples, aspects of the operations of block 1420 may be performed by a transmitter as described with reference to FIGS. 9 through 11.

Figure 15:
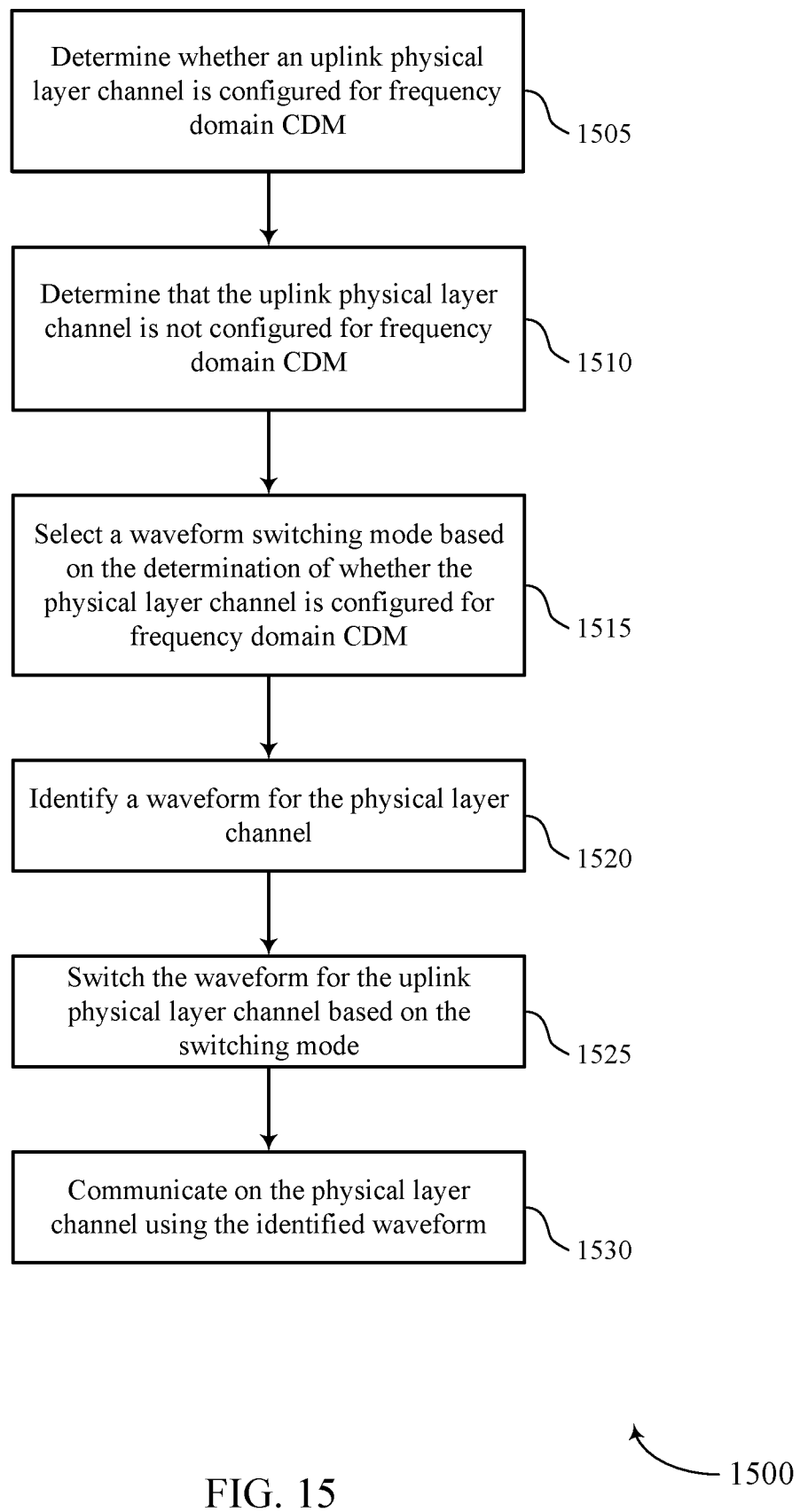

FIG. 15 shows a flowchart illustrating a method 1500 for UL channel dynamic waveform switching in accordance with various aspects of the present disclosure. The operations of method 1500 may be implemented by a UE 115 or base station 105 or its components as described herein. For example, the operations of method 1500 may be performed by a waveform switching manager as described with reference to FIGS. 9 through 11. In some examples, a UE 115 or base station 105 may execute a set of codes to control the functional elements of the device to perform the functions described below. Additionally or alternatively, the UE 115 or base station 105 may perform aspects the functions described below using special-purpose hardware.

At block 1505 the UE 115 or base station 105 may determine whether an uplink physical layer channel is configured for frequency domain CDM. The operations of block 1505 may be performed according to the methods described with reference to FIGS. 1 through 6. In certain examples, aspects of the operations of block 1505 may be performed by a CDM component as described with reference to FIGS. 9 through 11.

At block 1510 the UE 115 or base station 105 may determine that the uplink physical layer channel is not configured for frequency domain CDM, where the waveform switching mode comprises a switching mode. The operations of block 1510 may be performed according to the methods described with reference to FIGS. 1 through 6. In certain examples, aspects of the operations of block 1510 may be performed by a CDM component as described with reference to FIGS. 9 through 11.

At block 1515 the UE 115 or base station 105 may select a waveform switching mode. The operations of block 1515 may be performed according to the methods described with reference to FIGS. 1 through 6. In certain examples, aspects of the operations of block 1515 may be performed by a switching mode component as described with reference to FIGS. 9 through 11.

At block 1520 the UE 115 or base station 105 may identify a waveform for the physical layer channel based at least in part on the waveform switching mode. The operations of block 1520 may be performed according to the methods described with reference to FIGS. 1 through 6. In certain examples, aspects of the operations of block 1520 may be performed by a waveform selection component as described with reference to FIGS. 9 through 11.

At block 1525 the UE 115 or base station 105 may switch the waveform for the uplink physical layer channel based at least in part on the switching mode. The operations of block 1525 may be performed according to the methods described with reference to FIGS. 1 through 6. In certain examples, aspects of the operations of block 1525 may be performed by a waveform selection component as described with reference to FIGS. 9 through 11.

At block 1530 the UE 115 or base station 105 may communicate on the physical layer channel using the identified waveform. The operations of block 1530 may be performed according to the methods described with reference to FIGS. 1 through 6. In certain examples, aspects of the operations of block 1530 may be performed by a transmitter as described with reference to FIGS. 9 through 11.

Figure 16:
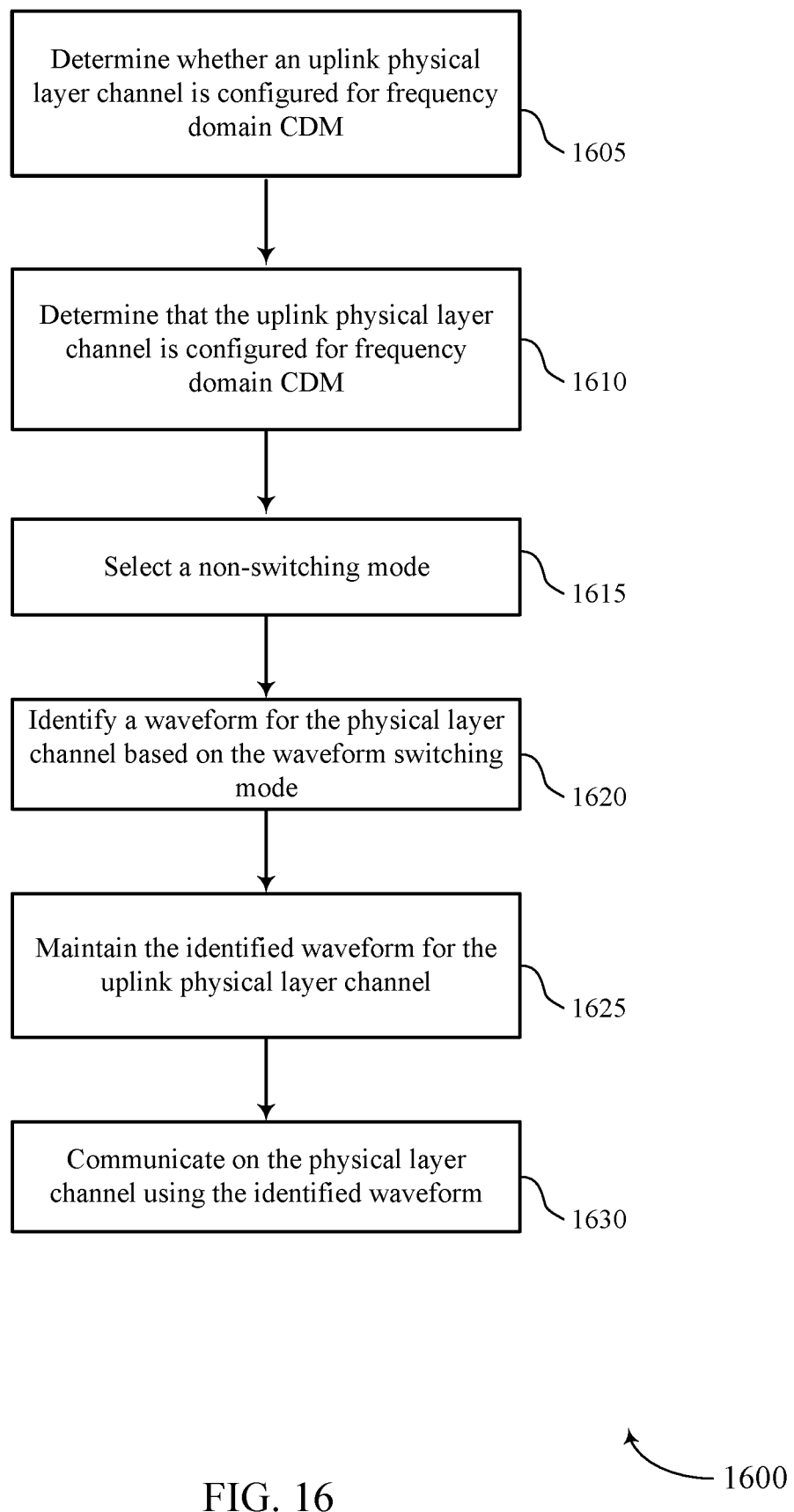

FIG. 16 shows a flowchart illustrating a method 1600 for UL channel dynamic waveform switching in accordance with various aspects of the present disclosure. The operations of method 1600 may be implemented by a UE 115 or base station 105 or its components as described herein. For example, the operations of method 1600 may be performed by a waveform switching manager as described with reference to FIGS. 9 through 11. In some examples, a UE 115 or base station 105 may execute a set of codes to control the functional elements of the device to perform the functions described below. Additionally or alternatively, the UE 115 or base station 105 may perform aspects the functions described below using special-purpose hardware.

At block 1605 the UE 115 or base station 105 may determine whether an uplink physical layer channel is configured for frequency domain CDM. The operations of block 1605 may be performed according to the methods described with reference to FIGS. 1 through 6. In certain examples, aspects of the operations of block 1605 may be performed by a CDM component as described with reference to FIGS. 9 through 11.

At block 1610 the UE 115 or base station 105 may determine that the uplink physical layer channel is configured for frequency domain CDM, where the waveform switching mode comprises a non-switching mode. The operations of block 1610 may be performed according to the methods described with reference to FIGS. 1 through 6. In certain examples, aspects of the operations of block 1610 may be performed by a CDM component as described with reference to FIGS. 9 through 11.

At block 1615 the UE 115 or base station 105 may select a waveform switching mode. The operations of block 1615 may be performed according to the methods described with reference to FIGS. 1 through 6. In certain examples, aspects of the operations of block 1615 may be performed by a switching mode component as described with reference to FIGS. 9 through 11.

At block 1620 the UE 115 or base station 105 may identify a waveform for the physical layer channel based at least in part on the waveform switching mode. The operations of block 1620 may be performed according to the methods described with reference to FIGS. 1 through 6. In certain examples, aspects of the operations of block 1620 may be performed by a waveform selection component as described with reference to FIGS. 9 through 11.

At block 1625 the UE 115 or base station 105 may maintain the identified waveform for the uplink physical layer channel based at least in part on the non-switching mode. The operations of block 1625 may be performed according to the methods described with reference to FIGS. 1 through 6. In certain examples, aspects of the operations of block 1625 may be performed by a waveform selection component as described with reference to FIGS. 9 through 11.

At block 1630 the UE 115 or base station 105 may communicate on the physical layer channel using the identified waveform. The operations of block 1630 may be performed according to the methods described with reference to FIGS. 1 through 6. In certain examples, aspects of the operations of block 1630 may be performed by a transmitter as described with reference to FIGS. 9 through 11.

Figure 17:
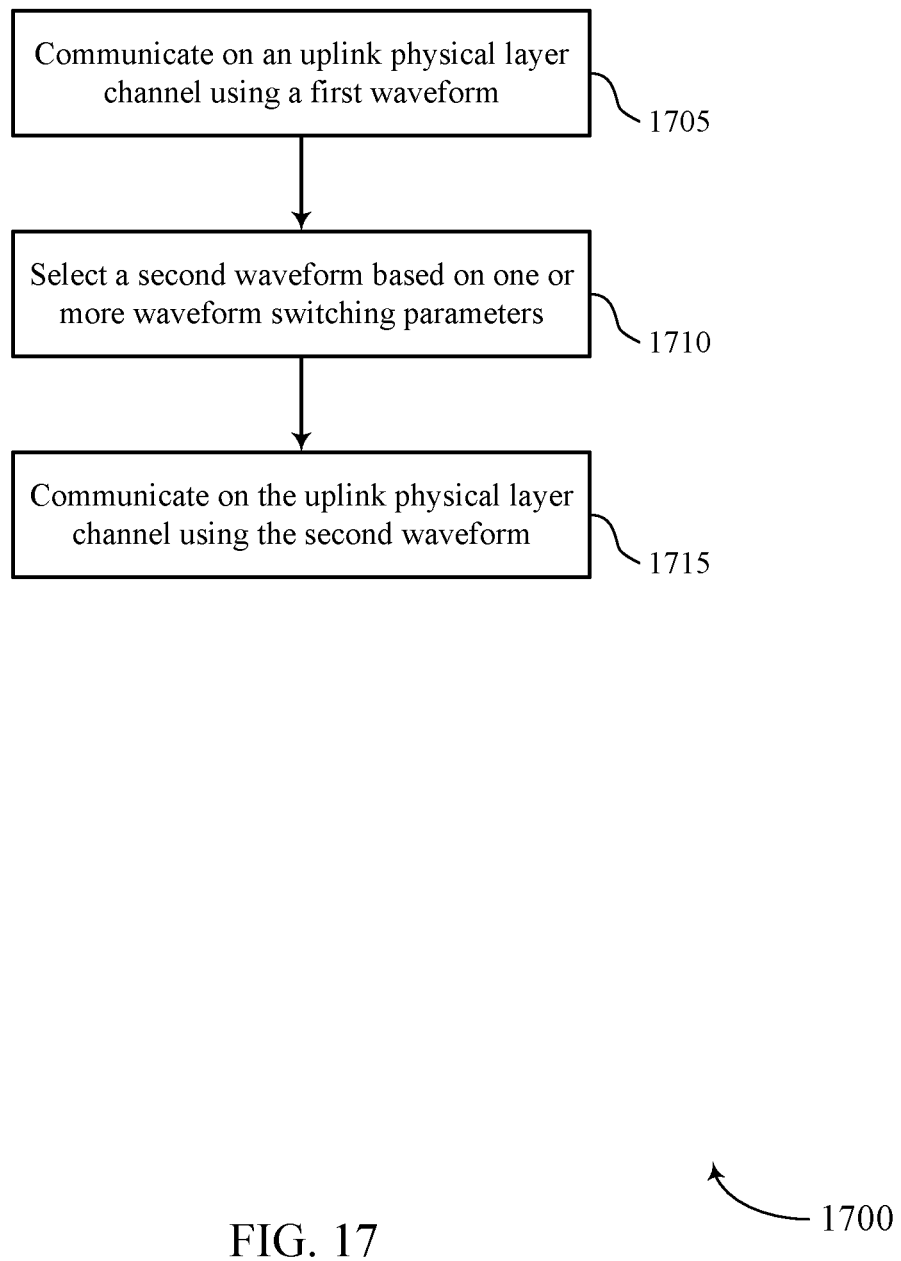

FIG. 17 shows a flowchart illustrating a method 1700 for UL channel dynamic waveform switching in accordance with various aspects of the present disclosure. The operations of method 1700 may be implemented by a UE 115 or base station 105 or its components as described herein. For example, the operations of method 1700 may be performed by a waveform switching manager as described with reference to FIGS. 9 through 11. In some examples, a UE 115 or base station 105 may execute a set of codes to control the functional elements of the device to perform the functions described below. Additionally or alternatively, the UE 115 or base station 105 may perform aspects the functions described below using special-purpose hardware.

At block 1705 the UE 115 or base station 105 may communicate on an uplink physical layer channel using a first waveform. The operations of block 1705 may be performed according to the methods described with reference to FIGS. 1 through 6. In certain examples, aspects of the operations of block 1705 may be performed by a transmitter as described with reference to FIGS. 9 through 11.

At block 1710 the UE 115 or base station 105 may select a second waveform based at least in part on one or more waveform switching parameters. The operations of block 1710 may be performed according to the methods described with reference to FIGS. 1 through 6. In certain examples, aspects of the operations of block 1710 may be performed by a waveform selection component as described with reference to FIGS. 9 through 11.

At block 1715 the UE 115 or base station 105 may communicate on the uplink physical layer channel using the second waveform. The operations of block 1715 may be performed according to the methods described with reference to FIGS. 1 through 6. In certain examples, aspects of the operations of block 1715 may be performed by a transmitter as described with reference to FIGS. 9 through 11.

Figure 18:
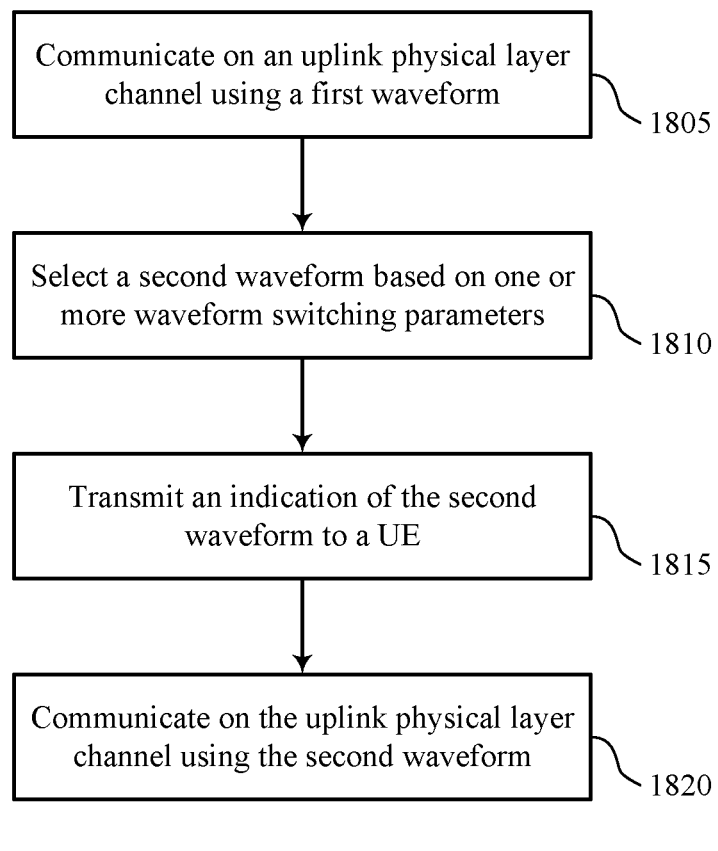

FIG. 18 shows a flowchart illustrating a method 1800 for UL channel dynamic waveform switching in accordance with various aspects of the present disclosure. The operations of method 1800 may be implemented by a base station 105 or its components as described herein. For example, the operations of method 1800 may be performed by a waveform switching manager as described with reference to FIGS. 9 through 11. In some examples, a base station 105 may execute a set of codes to control the functional elements of the device to perform the functions described below. Additionally or alternatively, the base station 105 may perform aspects the functions described below using special-purpose hardware.

At block 1805 the base station 105 may communicate on an uplink physical layer channel using a first waveform. The operations of block 1805 may be performed according to the methods described with reference to FIGS. 1 through 6. In certain examples, aspects of the operations of block 1805 may be performed by a transmitter as described with reference to FIGS. 9 through 11.

At block 1810 the base station 105 may select a second waveform based at least in part on one or more waveform switching parameters. The operations of block 1810 may be performed according to the methods described with reference to FIGS. 1 through 6. In certain examples, aspects of the operations of block 1810 may be performed by a waveform selection component as described with reference to FIGS. 9 through 11.

At block 1815 the base station 105 may transmit an indication of the second waveform to a UE. The operations of block 1815 may be performed according to the methods described with reference to FIGS. 1 through 6. In certain examples, aspects of the operations of block 1815 may be performed by a waveform indication component as described with reference to FIGS. 9 through 11.

At block 1820 the base station 105 may communicate on the uplink physical layer channel using the second waveform. The operations of block 1820 may be performed according to the methods described with reference to FIGS. 1 through 6. In certain examples, aspects of the operations of block 1820 may be performed by a transmitter as described with reference to FIGS. 9 through 11.

Figure 19:
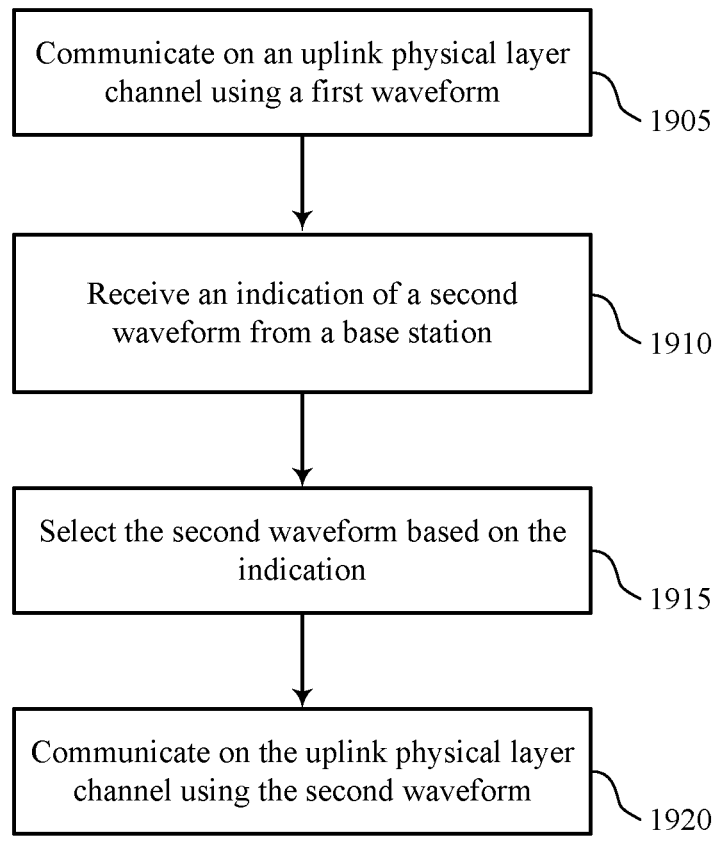

FIG. 19 shows a flowchart illustrating a method 1900 for UL channel dynamic waveform switching in accordance with various aspects of the present disclosure. The operations of method 1900 may be implemented by a UE 115 or its components as described herein. For example, the operations of method 1900 may be performed by a waveform switching manager as described with reference to FIGS. 9 through 11. In some examples, a UE 115 may execute a set of codes to control the functional elements of the device to perform the functions described below. Additionally or alternatively, the UE 115 may perform aspects the functions described below using special-purpose hardware.

At block 1905 the UE 115 may communicate on an uplink physical layer channel using a first waveform. The operations of block 1905 may be performed according to the methods described with reference to FIGS. 1 through 6. In certain examples, aspects of the operations of block 1905 may be performed by a transmitter as described with reference to FIGS. 9 through 11.

At block 1910 the UE 115 may receive an indication of a second waveform from a base station, where the second waveform is selected based at least in part on the indication. The operations of block 1910 may be performed according to the methods described with reference to FIGS. 1 through 6. In certain examples, aspects of the operations of block 1910 may be performed by a waveform indication component as described with reference to FIGS. 9 through 11.

At block 1915 the UE 115 may select the second waveform based at least in part on one or more waveform switching parameters (including the indication). The operations of block 1915 may be performed according to the methods described with reference to FIGS. 1 through 6. In certain examples, aspects of the operations of block 1915 may be performed by a waveform selection component as described with reference to FIGS. 9 through 11.

At block 1920 the UE 115 may communicate on the uplink physical layer channel using the second waveform. The operations of block 1920 may be performed according to the methods described with reference to FIGS. 1 through 6. In certain examples, aspects of the operations of block 1920 may be performed by a transmitter as described with reference to FIGS. 9 through 11.

Figure 20:
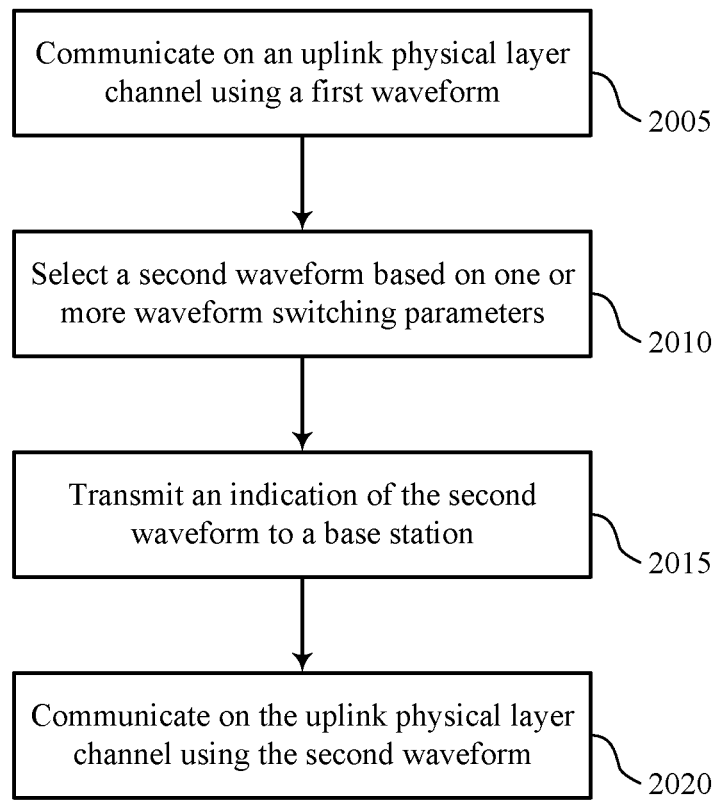

FIG. 20 shows a flowchart illustrating a method 2000 for UL channel dynamic waveform switching in accordance with various aspects of the present disclosure. The operations of method 2000 may be implemented by a UE 115 or its components as described herein. For example, the operations of method 2000 may be performed by a waveform switching manager as described with reference to FIGS. 9 through 11. In some examples, a UE 115 may execute a set of codes to control the functional elements of the device to perform the functions described below. Additionally or alternatively, the UE 115 may perform aspects the functions described below using special-purpose hardware.

At block 2005 the UE 115 may communicate on an uplink physical layer channel using a first waveform. The operations of block 2005 may be performed according to the methods described with reference to FIGS. 1 through 6. In certain examples, aspects of the operations of block 2005 may be performed by a transmitter as described with reference to FIGS. 9 through 11.

At block 2010 the UE 115 may select a second waveform based at least in part on one or more waveform switching parameters. The operations of block 2010 may be performed according to the methods described with reference to FIGS. 1 through 6. In certain examples, aspects of the operations of block 2010 may be performed by a waveform selection component as described with reference to FIGS. 9 through 11.

At block 2015 the UE 115 may transmit an indication of the second waveform to a base station. The operations of block 2015 may be performed according to the methods described with reference to FIGS. 1 through 6. In certain examples, aspects of the operations of block 2015 may be performed by a waveform indication component as described with reference to FIGS. 9 through 11.

At block 2020 the UE 115 may communicate on the uplink physical layer channel using the second waveform. The operations of block 2020 may be performed according to the methods described with reference to FIGS. 1 through 6. In certain examples, aspects of the operations of block 2020 may be performed by a transmitter as described with reference to FIGS. 9 through 11.

Figure 21:
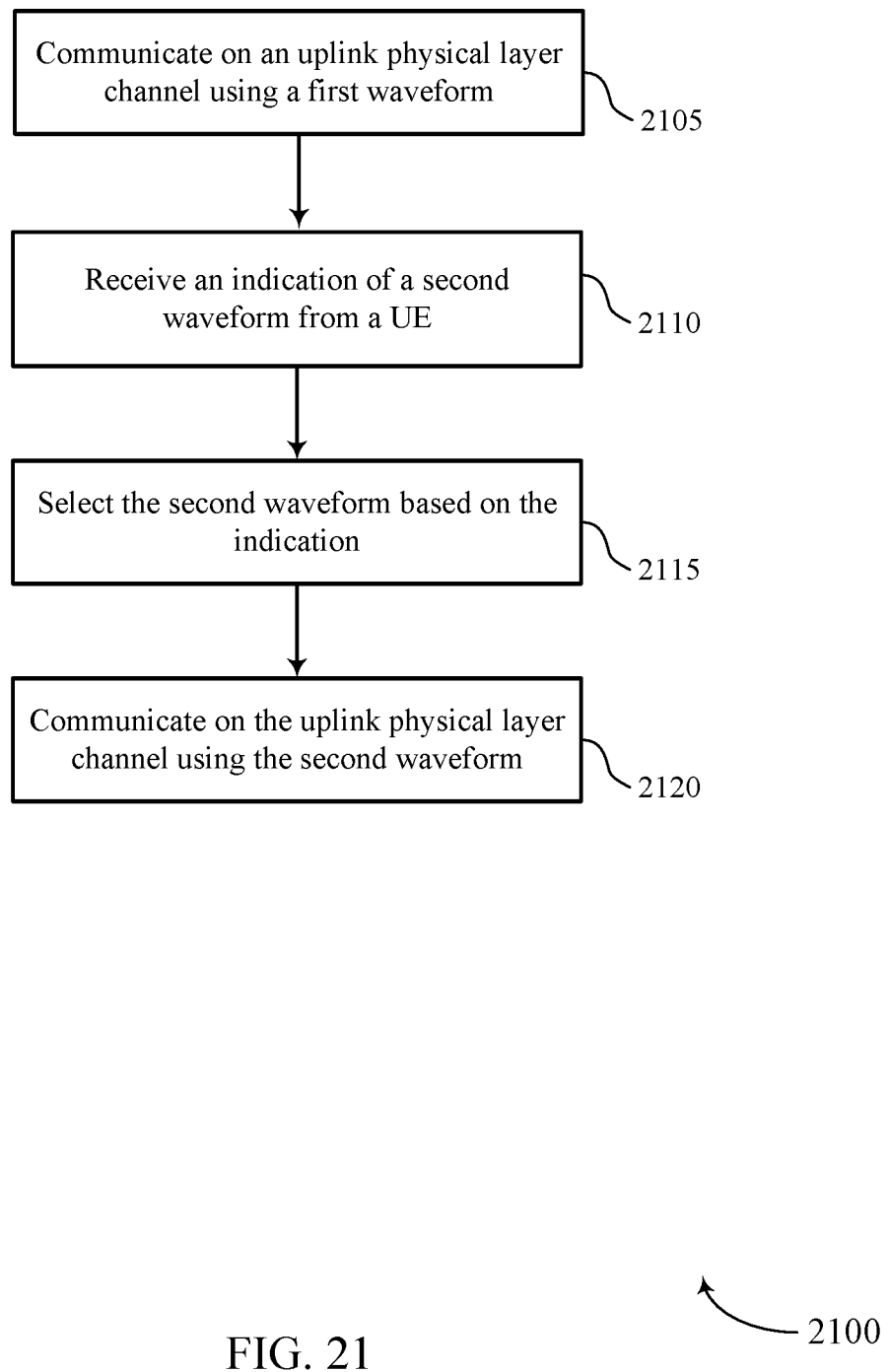

FIG. 21 shows a flowchart illustrating a method 2100 for UL channel dynamic waveform switching in accordance with various aspects of the present disclosure. The operations of method 2100 may be implemented by a base station 105 or its components as described herein. For example, the operations of method 2100 may be performed by a waveform switching manager as described with reference to FIGS. 9 through 11. In some examples, a base station 105 may execute a set of codes to control the functional elements of the device to perform the functions described below. Additionally or alternatively, the base station 105 may perform aspects the functions described below using special-purpose hardware.

At block 2105 the base station 105 may communicate on an uplink physical layer channel using a first waveform. The operations of block 2105 may be performed according to the methods described with reference to FIGS. 1 through 6. In certain examples, aspects of the operations of block 2105 may be performed by a transmitter as described with reference to FIGS. 9 through 11.

At block 2110 the base station 105 may receive an indication of a second waveform from a UE, where the second waveform is selected based at least in part on the indication. The operations of block 2110 may be performed according to the methods described with reference to FIGS. 1 through 6. In certain examples, aspects of the operations of block 2110 may be performed by a waveform indication component as described with reference to FIGS. 9 through 11.

At block 2115 the base station 105 may select the second waveform based at least in part on one or more waveform switching parameters (including the indication). The operations of block 2115 may be performed according to the methods described with reference to FIGS. 1 through 6. In certain examples, aspects of the operations of block 2115 may be performed by a waveform selection component as described with reference to FIGS. 9 through 11.

At block 2120 the base station 105 may communicate on the uplink physical layer channel using the second waveform. The operations of block 2120 may be performed according to the methods described with reference to FIGS. 1 through 6. In certain examples, aspects of the operations of block 2120 may be performed by a transmitter as described with reference to FIGS. 9 through 11.

It should be noted that the methods described above describe possible implementations, and that the operations and the operations may be rearranged or otherwise modified and that other implementations are possible. Furthermore, aspects from two or more of the methods may be combined.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   communicating on an uplink physical layer channel using a first waveform in a first symbol of a transmission time interval (TTI);
   identifying, at a first user equipment (UE), one or more waveform switching parameters;
   detecting, at the first UE, a change in the one or more waveform switching parameters;
   determining, at the first UE, to switch to communicating on the uplink physical layer channel using a second waveform;
   dynamically selecting, at the first UE, the second waveform based at least in part on detecting the change in the one or more waveform switching parameters and the determination to switch to using the second waveform;
   setting, in an uplink transmission on the uplink physical layer channel, a bit indicative of the switch from using the first waveform for communications to using the second waveform for communications;
   transmitting, to a base station during uplink communications on the uplink physical layer channel, the uplink transmission comprising the bit indicative of the switch from using the first waveform for communications to using the second waveform for communications based at least in part on detecting the change in the one or more waveform switching parameters and dynamically selecting the second waveform; and communicating on the uplink physical layer channel using the second waveform in a second symbol of the TTI based at least in part on transmitting the indication of the switch.

2. The method of claim 1, further comprising:
identifying a change in a multiple-input multiple output (MIMO) configuration, wherein the one or more waveform switching parameters comprise a parameter based on the MIMO configuration.

3. The method of claim 1, further comprising:
identifying a change in a single-input multiple output (SIMO) configuration, wherein the one or more waveform switching parameters comprise a parameter based on the SIMO configuration.

4. The method of claim 1, further comprising:
identifying a change in a Doppler shift of the first UE, wherein the one or more waveform switching parameters comprise a parameter based on the Doppler shift of the first UE.

5. The method of claim 4, wherein communicating on the uplink physical layer channel using the second waveform comprises:
communicating using a multi-cluster transmission pattern based at least in part on the change in the Doppler shift.

6. The method of claim 1, further comprising:
identifying a change in a link budget of the first UE, wherein the one or more waveform switching parameters comprise a parameter based on the link budget of the first UE.

7. The method of claim 1, further comprising:
identifying a change in SNR of the first UE, wherein the one or more waveform switching parameters comprise a parameter based on the SNR of the first UE.

8. The method of claim 1, further comprising:
identifying a change in an MCS of the first UE, wherein the one or more waveform switching parameters comprise a parameter based on the MCS of the first UE.

9. The method of claim 1, wherein the one or more waveform switching parameters comprise at least two of a multiple-input multiple output (MIMO) configuration, a single-input multiple output (SIMO) configuration, a number of channels, a Doppler shift, a link budget, a signal to noise ratio (SNR), and a modulation coding scheme (MCS).

10. The method of claim 1, wherein the second waveform is applied to data transmissions, reference signal transmissions, or both.

11. The method of claim 1, wherein communicating on the uplink physical layer channel using the first waveform comprises transmitting a physical uplink shared channel (PUSCH) during the first symbol of the TTI; and
communicating on the uplink physical layer channel using the second waveform comprises transmitting the PUSCH during the second symbol of the TTI.

12. The method of claim 11, further comprising:
transmitting a sounding reference signal (SRS) during the second symbol of the TTI.

13. The method of claim 1, further comprising:
transmitting a second indication of the second waveform to a second UE.

14. The method of claim 1, further comprising:
receiving a second indication of the second waveform from the base station, wherein the second waveform is dynamically selected based at least in part on the second indication.

15. The method of claim 1, further comprising:
receiving a second indication of the second waveform from a second UE, wherein the second waveform is dynamically selected based at least in part on the second indication.

16. The method of claim 1, wherein the second waveform is autonomously dynamically selected by the first UE based at least in part on the one or more waveform switching parameters.

17. The method of claim 16, wherein the second waveform is identified by the base station independently of the first UE.

18. The method of claim 1, wherein the first waveform comprises an orthogonal frequency division multiplexing (OFDM) waveform and the second waveform comprises a single carrier frequency division multiplexing (SC-FDM) waveform.

19. The method of claim 1, wherein the first waveform comprises a single carrier frequency division multiplexing (SC-FDM) waveform and the second waveform comprises an orthogonal frequency division multiplexing (OFDM).

20. A method for wireless communication, comprising:
communicating on an uplink physical layer channel using a first waveform;
identifying, at a first user equipment (UE), one or more waveform switching parameters;
identifying a number of channels in a transmission time interval (TTI) of the uplink physical layer channel, wherein the one or more waveform switching parameters comprise a parameter based on the number of channels in the TTI;
detecting, at the first UE, a change in the one or more waveform switching parameters;
determining, at the first UE, to switch to communicating on the uplink physical layer channel using a second waveform;
dynamically selecting, at the first UE, the second waveform based at least in part on detecting the change in the one or more waveform switching parameters and the determination to switch to using the second waveform;
transmitting, to a base station, an indication of the switch to using the second waveform for communications; and
communicating on the uplink physical layer channel using the second waveform.

21. The method of claim 20, wherein the uplink physical layer channel comprises a physical uplink shared channel (PUSCH), and wherein identifying the number of channels in the TTI comprises:
determining that a physical uplink control channel (PUCCH) transmission or a sounding reference signal (SRS) transmission is scheduled during the TTI.

22. An apparatus for wireless communication, in a system comprising:
a processor;
memory coupled with the processor; and
instructions stored in the memory and operable, when executed by the processor, to cause the apparatus to:
communicate on an uplink physical layer channel using a first waveform in a first symbol of a transmission time interval (TTI);
identify, at a first user equipment (UE), one or more waveform switching parameters;
detect, at the first UE, a change in the one or more waveform switching parameters;

determine, at the first UE, to switch to communicate on the uplink physical layer channel using a second waveform;

dynamically select, at the first UE, the second waveform based at least in part on detecting the change in the one or more waveform switching parameters and the determination to switch to using the second waveform;

set, in an uplink transmission on the uplink physical layer channel, a bit indicative of the switch from using the first waveform for communications to using the second waveform for communications;

transmit, to a base station during uplink communications on the uplink physical layer channel, the uplink transmission comprising the bit indicative of the switch to using the second waveform for communications based at least in part on detecting the change in the one or more waveform switching parameters and dynamically selecting the second waveform; and communicate on the uplink physical layer channel using the second waveform in a second symbol of the TTI based at least in part on transmitting the indication of the switch.

23. The apparatus of claim 22, wherein the instructions are operable, when executed by the processor, to cause the apparatus to:

identify a change in a multiple-input multiple output (MIMO) configuration, wherein the one or more waveform switching parameters comprise a parameter based on the MIMO configuration.

\* \* \* \* \*